United States Patent
Zhao et al.

(10) Patent No.: US 12,519,966 B2
(45) Date of Patent: *Jan. 6, 2026

(54) IMAGE OR VIDEO CODING BASED ON PALETTE MODE

(71) Applicant: LG ELECTRONICS INC., Seoul (KR)

(72) Inventors: Jie Zhao, Seoul (KR); Seethal Paluri, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,575

(22) Filed: Aug. 26, 2024

(65) Prior Publication Data

US 2024/0422339 A1  Dec. 19, 2024

Related U.S. Application Data

(63) Continuation of application No. 17/638,787, filed as application No. PCT/KR2020/011383 on Aug. 26, 2020, now Pat. No. 12,096,017.

(60) Provisional application No. 62/891,951, filed on Aug. 26, 2019.

(51) Int. Cl.
| | | |
|---|---|---|
| *H04N 19/46* | (2014.01) | |
| *H04N 19/132* | (2014.01) | |
| *H04N 19/176* | (2014.01) | |
| *H04N 19/186* | (2014.01) | |

(52) U.S. Cl.
CPC .......... *H04N 19/46* (2014.11); *H04N 19/132* (2014.11); *H04N 19/176* (2014.11); *H04N 19/186* (2014.11)

(58) Field of Classification Search
None
See application file for complete search history.

(56) References Cited

U.S. PATENT DOCUMENTS

2017/0085891 A1\*  3/2017  Seregin ................ H04N 19/124
2017/0180737 A1\*  6/2017  Ye .......................... H04N 19/70

\* cited by examiner

*Primary Examiner* — Xiaolan Xu
(74) *Attorney, Agent, or Firm* — Bryan Cave Leighton Paisner LLP

(57) ABSTRACT

According to the disclosure of the present documents, a quantization parameter used in a scaling process of a quantized escape value in a palette mode may be derived on the basis of minimum quantization parameter information relating to a transform skip mode. Accordingly, the amount of data required to be signaled for video/image coding can be reduced and escape coding in a palette mode can be effectively performed.

3 Claims, 11 Drawing Sheets

FIG. 7 horizontal traverse scan (a)

vertical traverse scan (b)

IMAGE OR VIDEO CODING BASED ON PALETTE MODE

CROSS-REFERENCE TO RELATED APPLICATIONS

This application is a Continuation of U.S. patent application Ser. No. 17/638,787, filed on Feb. 25, 2022, which is a National Stage Application of International Application No. PCT/KR2020/011383, filed on Aug. 26, 2020, which claims the benefit of and priority to U.S. Provisional Application No. 62/891,951, filed on Aug. 26, 2019, which are hereby incorporated by reference in their entirety for all purposes as if fully set forth herein.

BACKGROUND OF THE DISCLOSURE

Field of the Disclosure

The present disclosure relates to video or image coding and, for example, to a palette mode based coding technique.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

Furthermore, there is also discussion of a palette mode coding technique to improve coding efficiency for screen content, such as computer generated video which contains a significant amount of text and graphics. In order to efficiently apply this technique, a method for coding and signaling related information is required.

SUMMARY

An object of the present disclosure is to provide a method and apparatus for improving video/image coding efficiency.

Another object of the present disclosure is to provide a method and apparatus for improving efficiency in palette mode coding.

Yet another object of the present disclosure is to provide a method and apparatus for efficiently configuring and signaling various types of information used in palette mode coding.

Still another object of the present disclosure is to provide a method and apparatus for efficiently applying escape coding in a palette mode.

According to an embodiment of the present disclosure, a quantization parameter used in a scaling process for a quantized escape value in a palette mode may be derived based on minimum quantization parameter information for a transform skip mode. The quantization parameter may have a value equal to or greater than a minimum quantization parameter value for the transform skip mode.

According to an embodiment of the present disclosure, a range of quantized escape values in the palette mode may be limited based on a bit depth. For example, a range of quantized escape value information for a luma component has values between 0 and $(1<<BitDepth_Y)-1$, and the range of quantized escape value information for a chroma component may have values from 0 to $(1<<BitDepth_C)-1$.

According to an embodiment of the present disclosure, palette size information regarding a maximum index of a palette table may be defined and signaled through a sequence parameter set (SPS).

According to an embodiment of the present disclosure, a video/image decoding method performed by a decoding apparatus is provided. The video/image decoding method may include a method disclosed in the embodiments of the present disclosure.

According to an embodiment of the present disclosure, a decoding apparatus for performing video/image decoding is provided. The decoding apparatus may perform a method disclosed in the embodiments of the present disclosure.

According to an embodiment of the present disclosure, a video/image encoding method performed by an encoding apparatus is provided. The video/image encoding method may include a method disclosed in the embodiments of the present disclosure.

According to an embodiment of the present disclosure, an encoding apparatus for performing video/image encoding is provided. The encoding apparatus may perform a method disclosed in the embodiments of the present disclosure.

According to an embodiment of the present disclosure, there is provided a computer-readable digital storage medium in which encoded video/image information generated according to the video/image encoding method disclosed in at least one of the embodiments of the present disclosure is stored.

According to an embodiment of the present disclosure, there is provided a computer-readable digital storage medium in which encoded information or encoded video/image information causing the decoding apparatus to perform the video/image decoding method disclosed in at least one of the embodiments of the present disclosure is stored.

Advantageous Effects

The present disclosure has various effects. For example, according to an embodiment of the present disclosure, it is possible to improve overall image/video compression efficiency. In addition, according to an embodiment of the present disclosure, it is possible to improve the efficiency in palette mode coding. Further, according to an embodiment of the present disclosure, it is possible to efficiently configure and signal various types of information used in palette mode coding. In addition, according to an embodiment of the present disclosure, it is possible to improve accuracy and coding efficiency for escape samples by efficiently applying escape coding in the palette mode.

Effects that can be obtained through specific embodiments of the present disclosure are not limited to the effects listed above. For example, various technical effects that a person having ordinary skill in the related art can understand or derive from the present disclosure may exist. Accordingly, the specific effects of the present disclosure are not limited to those explicitly described in the present disclosure and may include various effects that can be understood or derived from the technical features of the present disclosure.

BRIEF DESCRIPTION OF THE DRAWINGS

FIG. 7 shows an example for describing horizontal and vertical traverse scan methods used to code a palette index map.

DESCRIPTION OF EXEMPLARY EMBODIMENTS

Figure 1:
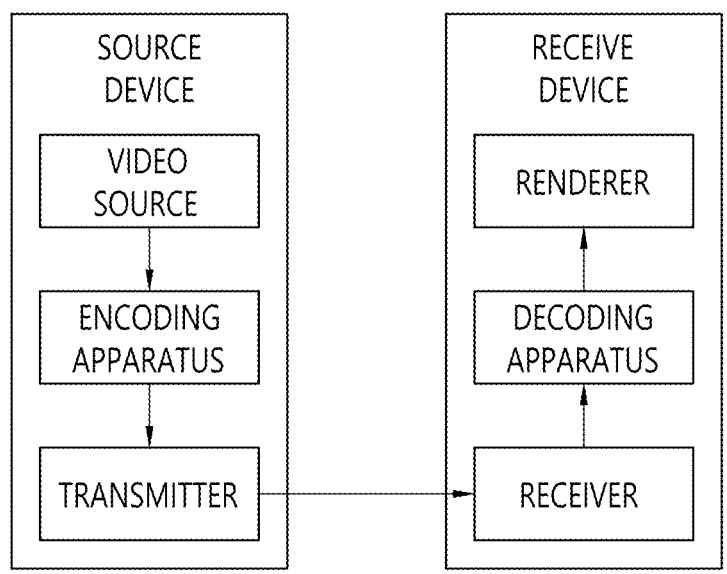
FIG. 1 schematically shows an example of a video/image coding system applicable to embodiments of the present disclosure.

The present disclosure may be modified in various ways and may have various embodiments, and specific embodiments will be illustrated in the drawings and described in detail. However, this does not intend to limit the present disclosure to the specific embodiments. Terms commonly used in this specification are used to describe a specific embodiment and is not used to limit the technical spirit of the present disclosure. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in the present disclosure are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of the present disclosure unless it deviates from the essence of the present disclosure.

In the present disclosure, the term "A or B" may mean "only A", "only B", or "both A and B". In other words, in the present disclosure, the term "A or B" may be interpreted to indicate "A and/or B". For example, in the present disclosure, the term "A, B or C" may mean "only A", "only B", "only C", or "any combination of A, B and C".

A slash "/" or a comma used in the present disclosure may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B", or "both A and B". Further, in the present disclosure, the expression "at least one of A or B" or "at least one of A and/or B" may be interpreted the same as "at least one of A and B".

Further, in the present disclosure, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present disclosure may mean "for example". Specifically, in the case that "prediction (intra prediction)" is expressed, it may be indicated that "intra prediction" is proposed as an example of "prediction". In other words, the term "prediction" in the present disclosure is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

The present disclosure relates to video/image coding. For example, the methods/embodiments disclosed in the present disclosure may be applied to a method disclosed in versatile video coding (VVC). Further, the methods/embodiments disclosed in the present disclosure may be applied to a method disclosed in the the essential video coding (EVC) standard, the AOMedia Video 1 (AV1) standard, the 2nd generation of audio video coding standard (AVS2), or the next generation video/image coding standard (ex. H.267 or H.268, etc.).

The present disclosure presents various embodiments of video/image coding, and the embodiments may be performed in combination with each other unless otherwise mentioned.

In the present disclosure, a video may mean a set of a series of images according to the passage of time. A picture generally means a unit representing one image in a specific time period, and a slice/tile is a unit constituting a part of the picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, a sample may mean a pixel value in the spatial domain, or may mean a transform coefficient in the frequency domain when the pixel value is transformed into the frequency domain.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In the present disclosure, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of the present disclosure as well.

In the present disclosure, technical features individually explained in one drawing may be individually implemented, or may be simultaneously implemented.

Hereinafter, preferred embodiments of the present disclosure are described more specifically with reference to the accompanying drawings. Hereinafter, in the drawings, the same reference numeral is used in the same element, and a redundant description of the same element may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
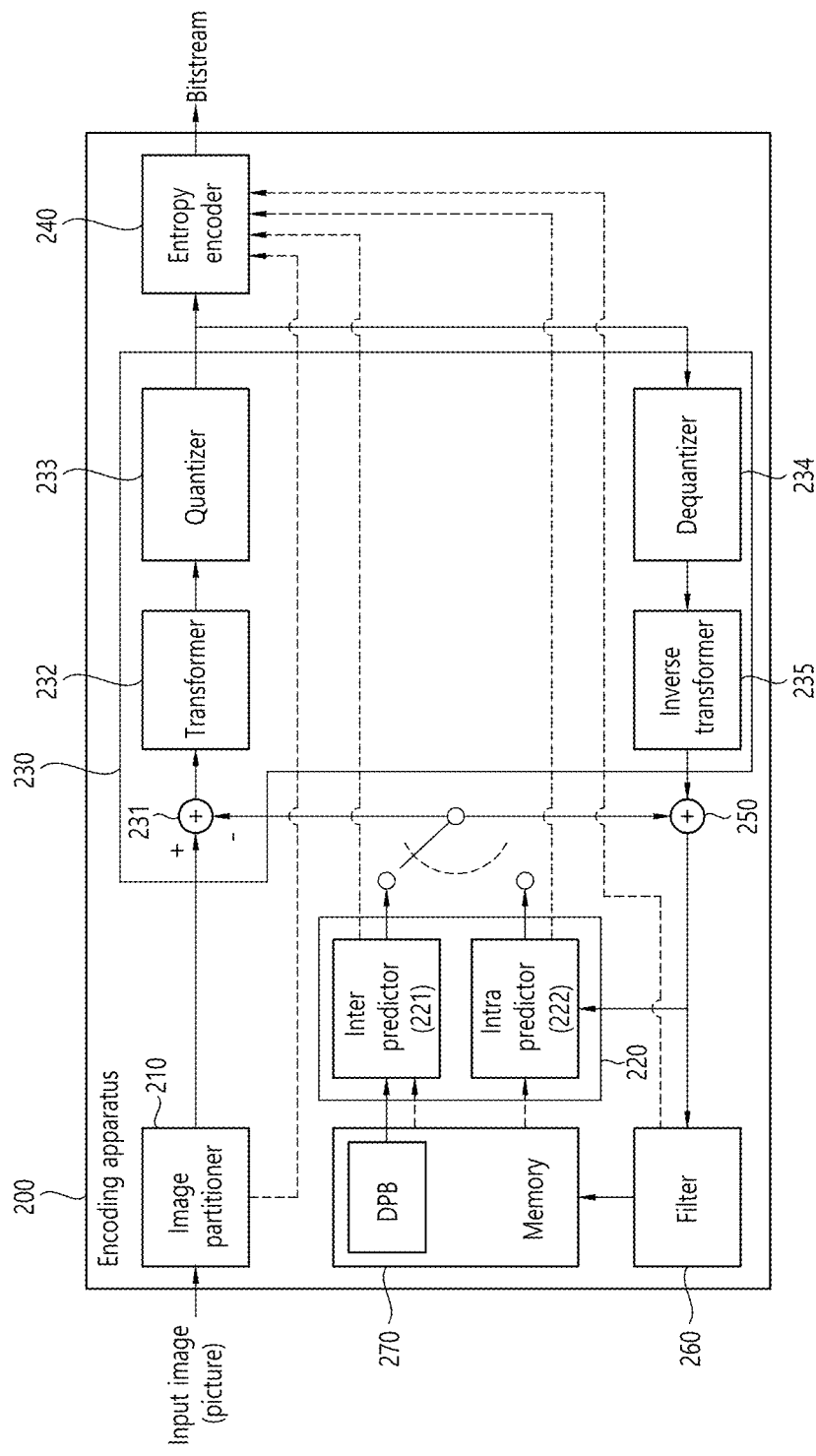
FIG. 2 is a diagram schematically illustrating a configuration of a video/image encoding apparatus to which embodiments of the present disclosure are applicable.

FIG. 2 is a diagram schematically illustrating a configuration of a video/image encoding apparatus to which embodiments of the present disclosure are applicable. Hereinafter, an encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
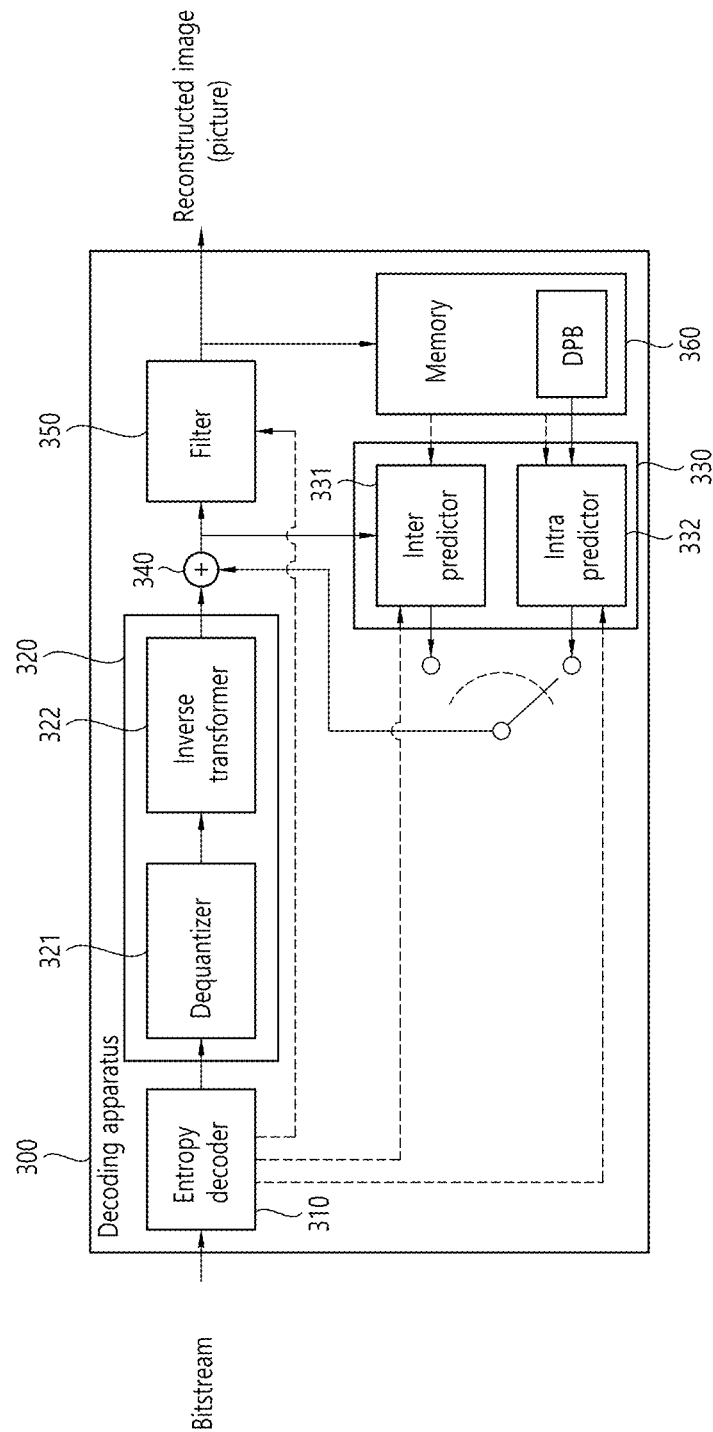
FIG. 3 is a diagram schematically illustrating a configuration of a video/image decoding apparatus to which embodiments of the present disclosure are applicable.

FIG. 3 is a diagram schematically illustrating a configuration of a video/image decoding apparatus to which embodiments of the present disclosure are applicable. Hereinafter, a decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present disclosure, the embodiments described in the filter 260, the inter predictor 221, and the intra predictor 222 of the encoding apparatus 200 may be equally applied to the filter 350, the inter predictor 332, and the intra predictor 331 of the decoding apparatus 300.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
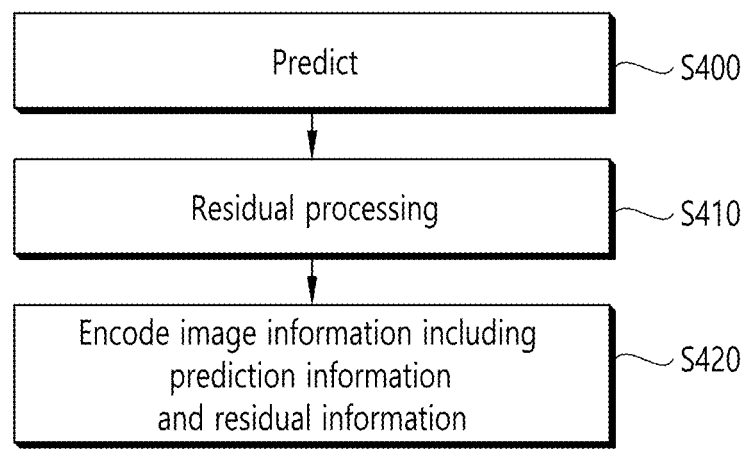
FIG. 4 shows an example of a schematic video/image encoding procedure to which embodiment(s) of the present disclosure are applicable.

FIG. 4 shows an example of a schematic video/image encoding procedure to which embodiment(s) of the present disclosure are applicable. In FIG. 4, S400 may be performed by the predictor 220 of the encoding apparatus described above in FIG. 2, S410 may be performed by the residual processor 230, and S420 may be performed by the entropy encoder 240. S400 may include the inter/intra prediction procedure described in the present disclosure, S410 may include the residual processing procedure described in the present disclosure, and S420 may include the information encoding procedure described in the present disclosure.

Referring to FIG. 4, the video/image encoding procedure may include not only a procedure of encoding information for picture reconstruction (e.g., prediction information, residual information, partitioning information, etc.) and outputting the encoded information in the form of a bitstream, as represented in the description of FIG. 2, but also a procedure of generating a reconstructed picture for the current picture and a procedure (optional) of applying in-loop filtering to the reconstructed picture. The encoding apparatus may derive (modified) residual samples from transform coefficients quantized through the dequantizer 234 and the inverse transformer 235 and generate a reconstructed picture based on prediction samples output in S400 and the (modified) residual samples. The reconstructed picture thus generated may be the same as the reconstructed picture generated by the above-described decoding apparatus. A modified reconstructed picture may be generated through an in-loop filtering procedure for the reconstructed picture, which may be stored in a decoded picture buffer or memory 270, and, as in the case of the decoding apparatus, may be used as a reference picture in an inter prediction procedure during subsequent picture encoding. As described above, a part or all of the in-loop filtering procedure may be omitted in some cases. When the in-loop filtering procedure is performed, (in-loop) filtering-related information (parameters) may be encoded by the entropy encoder 240 and output in the form of a bitstream, and the decoding apparatus may perform the in-loop filtering procedure in the same manner as that of the encoding apparatus based on the filtering-related information.

Through this in-loop filtering procedure, noise generated during image/video coding, such as blocking artifacts and ringing artifacts, can be reduced, and subjective/objective visual quality can be improved. In addition, by performing the in-loop filtering procedure in both the encoding apparatus and the decoding apparatus, the encoding apparatus and the decoding apparatus can derive the same prediction result, improve the reliability of picture coding and reduce the amount of data to be transmitted for picture coding.

As described above, the picture reconstruction procedure can be performed not only in the decoding apparatus but also in the encoding apparatus. A reconstructed block may be generated based on intra prediction/inter prediction for each block, and a reconstructed picture including reconstructed blocks may be generated. When the current picture/slice/tile group is an I picture/slice/tile group, blocks included in the current picture/slice/tile group may be reconstructed based on only intra prediction. On the other hand, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to some remaining blocks. A color component of a picture may include a luma component and a chroma component, and unless explicitly limited in the present disclosure, the methods and embodiments proposed in the present disclosure may be applied to the luma component and the chroma component.

Figure 5:
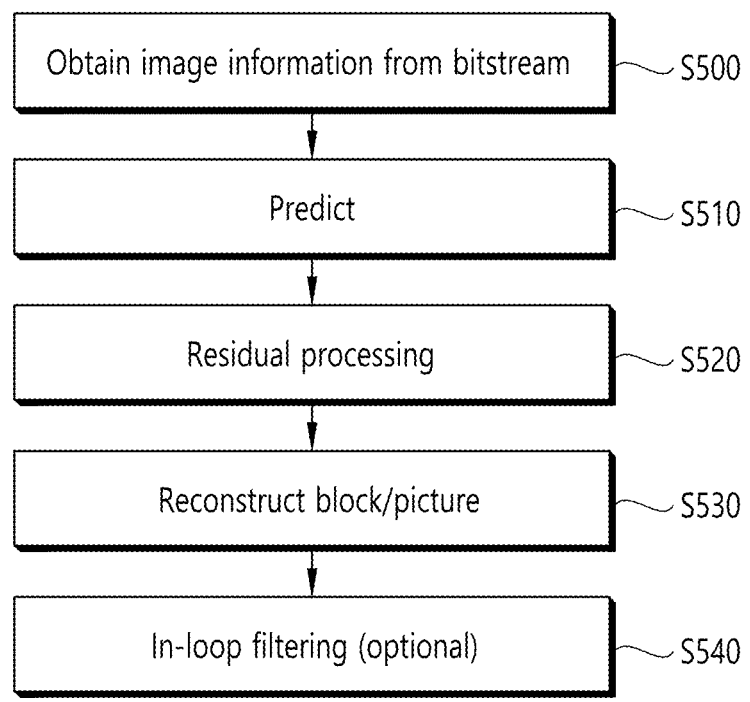
FIG. 5 shows an example of a schematic video/image decoding procedure to which embodiment(s) of the present disclosure are applicable.

FIG. 5 shows an example of a schematic video/image decoding procedure to which embodiment(s) of the present disclosure are applicable. In FIG. 5, S500 may be performed by the entropy decoder 310 of the decoding apparatus described above in FIG. 3, S510 may be performed by the predictor 330, S520 may be performed by the residual processor 320, S530 may be performed by the adder 340, and S540 may be performed by the filter 350. S500 may include the information decoding procedure described in the present disclosure, S510 may include the inter/intra prediction procedure described in the present disclosure, S520 may include the residual processing procedure described in the present disclosure, S530 may include the block/picture reconstruction procedure described in the present disclosure, and S540 may include the in-loop filtering procedure described in the present disclosure.

Referring to FIG. 5, the picture decoding procedure may include a procedure (S500) of acquiring image/video information from a bitstream (through decoding), a picture reconstruction procedure (S510 to S530) and an in-loop filtering procedure (S540) for a reconstructed picture, as represented in the description of FIG. 3. The picture reconstruction procedure may be performed based on prediction samples and residual samples obtained through the inter/intra prediction (S510) and residual processing (S520; dequantization and inverse transformation for quantized transform coefficients) described in the present disclosure. A modified reconstructed picture may be generated through an in-loop filtering procedure for a reconstructed picture generated through the picture reconstruction procedure, and the modified reconstructed picture may be output as a decoded picture. Further, the modified reconstructed picture may be stored in the decoded picture buffer or the memory 360 of the decoding apparatus and used as a reference picture in an inter prediction procedure during subsequent picture decoding.

In some cases, the in-loop filtering procedure may be omitted. In this case, the reconstructed picture may be output as a decoded picture, stored in the decoded picture buffer or the memory 360 of the decoding apparatus, used as a reference picture in an inter prediction during subsequent picture decoding. The in-loop filtering procedure (S540) may include a deblocking filtering procedure, a sample adaptive offset (SAO) procedure, an adaptive loop filter (ALF) procedure, and/or a bi-lateral filter procedure, as described above, and some or all thereof may be omitted. In addition, one or some of the deblocking filtering procedure, the sample adaptive offset (SAO) procedure, the adaptive loop filter (ALF) procedure, and the bi-lateral filter procedure may be sequentially applied, or all may be sequentially applied. For example, after the deblocking filtering procedure is applied to a reconstructed picture, the SAO procedure may be performed. For example, after the deblocking filtering procedure is applied to the reconstructed picture, the ALF procedure may be performed. This may be performed in the encoding apparatus in the same manner.

As described above, the encoding apparatus may derive a residual block (residual samples) based on a block (prediction samples) predicted through intra/inter/IBC prediction and the like and apply transformation and quantization to the derived residual samples to derive quantized transform coefficients. Information on the quantized transform coefficients (residual information) may be included in a residual coding syntax and output in the form of a bitstream after encoding. The decoding apparatus may obtain the information (residual information) about the quantized transform coefficients from the bitstream and decode the information to derive the quantized transform coefficients. The decoding apparatus may derive residual samples through dequantization/inverse transformation based on the quantized transform coefficients. As described above, at least one of the quantization/dequantization and/or transformation/inverse transformation may be skipped. When the transformation/inverse transformation is skipped, the transform coefficients may be called coefficients or residual coefficients, or may still be called transform coefficients for uniformity of expression. Whether the transformation/inverse transformation is omitted may be signaled based on transform_skip_flag. For example, when the value of transform_skip- _flag is 1, it can indicate that the transformation/inverse transformation is skipped, which may be referred to as a transform skip mode.

In general, in video/image coding, a quantization rate may be changed and a compression rate may be adjusted using the changed quantization rate. From the viewpoint of implementation, a quantization parameter (QP) may be used instead of a quantization rate in consideration of complexity. For example, quantization parameters of integer values from 0 to 63 may be used, and each quantization parameter value may correspond to an actual quantization rate. For example, a quantization parameter $QP_Y$ for a luma component (luma sample) and a quantization parameter $QP_C$ for a chroma component (chroma sample) may be set differently.

A quantization process may take a transform coefficient C as an input, divide it by a quantization rate $Q_{step}$, and based on this, obtain a quantized transform coefficient C'. In this case, in consideration of computational complexity, a quantization rate may be multiplied by a scale to form an integer and a shift operation may be performed by a value corresponding to the scale value. A quantization scale may be derived based on the product of the quantization rate and the scale value. That is, the quantization scale may be derived according to the QP. For example, a quantized transform coefficient C' may be derived by applying the quantization scale to the transform coefficient C.

The dequantization process is the inverse process of the quantization process and can obtain a reconstructed transform coefficient C" by multiplying the quantized transform coefficient C' by a quantization rate $Q_{step}$. In this case, a level scale may be derived according to the quantization parameter, and the reconstructed transform coefficient C" may be derived by applying the level scale to the quantized transform coefficient C'. The reconstructed transform coefficient C" may be slightly different from the original transform coefficient C due to loss in transformation and/or quantization processes. Accordingly, in the encoding apparatus, dequantization is performed in the same manner as in the decoding apparatus.

Meanwhile, prediction may be performed based on palette coding. Palette coding is a useful technique for representing blocks including a small number of unique color values. Instead of applying prediction and transformation to blocks, an index for indicating the color value of each sample is signalled in a palette mode. This palette mode is useful for saving a video memory buffer space. A block may be coded using the palette mode (e.g., MODE_PLT). In order to decode the block encoded in this manner, a decoder needs to decode a palette color and index. A palette color may be represented by a palette table and may be encoded by a palette table coding tool.

Figure 6:
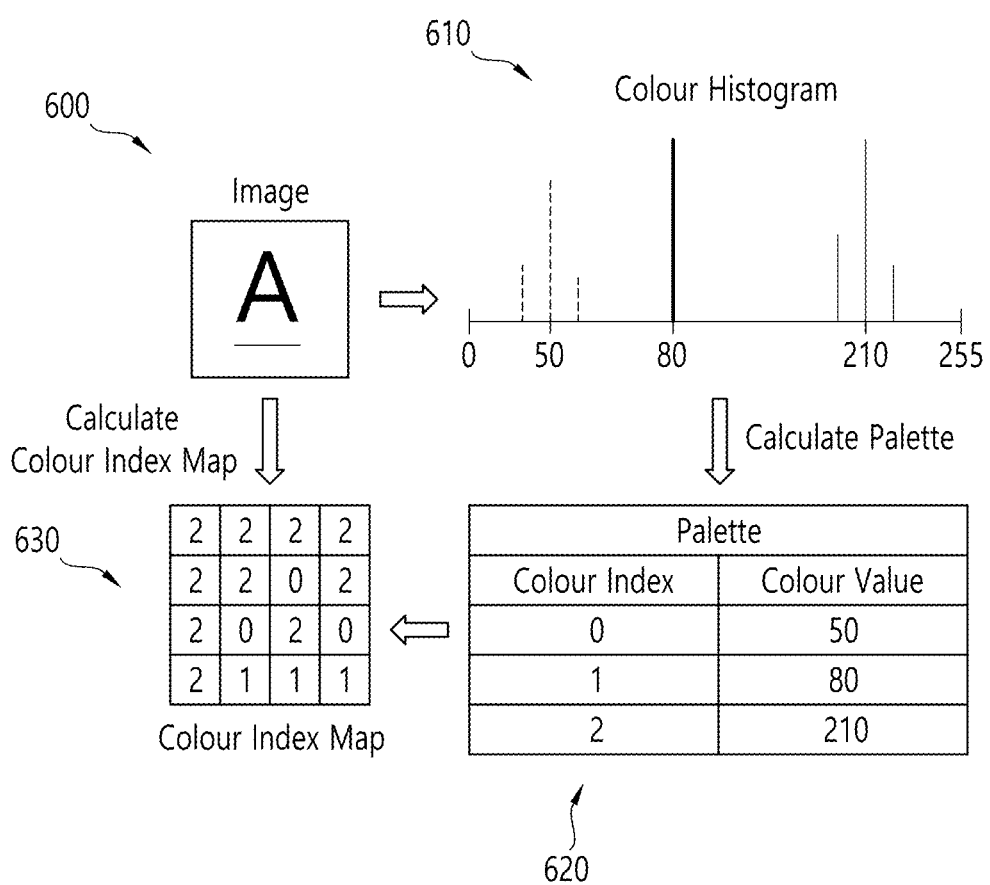
FIG. 6 shows an example for describing a basic structure of palette coding.

FIG. 6 shows an example for describing the basic structure of palette coding.

Referring to FIG. 6, an image 600 may be represented by a histogram 610. Here, dominant color values are typically mapped to color indexes (620) and the image may be coded using a color index map (630).

Palette coding may be referred to as an (intra) palette mode, an (intra) palette coding mode, or the like. The current block may be reconstructed according to palette coding or the palette mode. Palette coding may be regarded as an example of intra coding or may be regarded as one of intra prediction methods. However, similarly to the skip mode described above, additional residual values for the corresponding block may not be signaled.

For example, the palette mode can be used to improve coding efficiency for screen content such as computer generated video that contains a significant amount of text and graphics. In general, a local area of screen content has several colors distinguished by sharp edges. In order to take advantage of this property, the palette mode can represent samples of a block based on indexes indicating color entries in a palette table.

For example, information about the palette table may be signaled. The palette table may include an index value corresponding to each color. Palette index prediction data may be received, and the palette table may include data indicating index values for at least a part of a palette index map that maps pixels of video data to color indexes of the palette table. The palette index prediction data may include run value data that associates index values for at least a part of the palette index map with run values. A run value may be associated with an escape color index. The palette index map may be generated from the palette index prediction data, at least in part, by determining whether to adjust the index value of the palette index prediction data based on the last index value. The current block in a picture may be reconstructed according to the palette index map.

When the palette mode is used, pixel values of a CU may be represented by a set of representative color values. Such a set may be referred to as a palette. In the case of a pixel having a value close to a color value in the palette, a palette index corresponding to the color value in the palette may be signaled. In the case of a pixel having a color value other than the palette, the pixel may be represented by an escape symbol and a quantized pixel value may be directly signaled. In the present disclosure, a pixel or a pixel value may be referred to as a sample or a sample value.

In order to decode a block encoded in the palette mode, the decoder needs to decode palette colors and indexes. Palette colors can be represented in a palette table and encoded with a palette table coding tool. An escape flag may indicate whether an escape symbol is present in the current CU by being signaled for each CU. If an escape symbol is present, the palette table is incremented by 1 and the last index may be assigned to an escape mode. The palette indexes of all pixels in the CU may form a palette index map and may be encoded by the palette index map coding tool.

For example, a palette predictor may be maintained for coding of a palette table. The predictor may be initialized at the beginning of each slice where the predictor is reset to zero. For each entry of the palette predictor, a reuse flag may be signaled to indicate whether it is a part of the current palette. The reuse flag may be transmitted using run-length coding of zero. Then, the number of new palette entries may be signaled using zero-order exponential Golomb coding. Finally, a component value for a new palette entry may be signaled. After encoding the current CU, the palette predictor can be updated using the current palette, and entries of the old palette predictor which are not reused in the current palette can be added to the end of the new palette predictor until reaching an allowed maximum size (palette stuffing).

For example, an index may be coded using horizontal and vertical traverse scans in order to code the palette index map. The scan order may be explicitly signaled from a bitstream using flag information (e.g., palette_transpose_flag).

Figure 7:
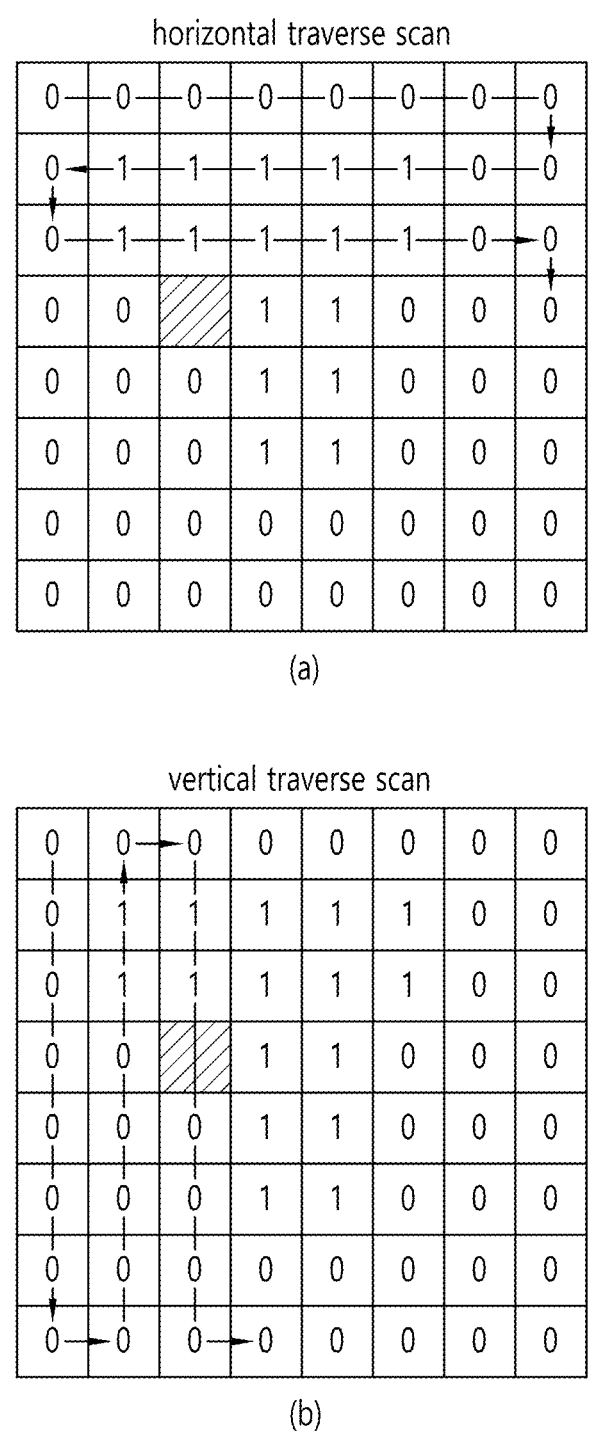

FIG. 7 shows an example for describing horizontal and vertical traverse scan methods used to code a palette index map.

FIG. 7(a) shows an example of coding a palette index map using horizontal traverse scan and FIG. 7(b) shows an example of coding the palette index map using vertical traverse scan.

As shown in FIG. 7(a), when horizontal scan is used, palette indexes may be coded by scanning samples from samples in the first row (top row) to samples in the last row (bottom row) in the current block (i.e., current CU) in the horizontal direction.

As shown in FIG. 7(b), when vertical scan is used, palette indexes may be coded by scanning samples from samples in the first column (leftmost column) to the last column (rightmost column) in the current block (i.e., current CU) in the vertical direction.

A palette index may be coded using two palette sample modes, for example, an "INDEX" mode and a "COPY_ABOVE" mode. Such a palette mode may be signaled using a flag indicating whether the mode is "INDEX" or "COPY_ABOVE". Here, the flag may be signaled except for the top row when horizontal scan is used, and the flag may be signal except for the first column A when vertical scan is used or when the previous mode is "COPY_ABOVE" mode. In the "COPY_ABOVE" mode, the palette index of the sample in the above row can be copied. In the "INDEX" mode, a palette index can be explicitly signaled. For both the "INDEX" mode and the "COPY_ABOVE" mode, a run value indicating the number of pixels coded using the same mode may be signaled.

The encoding order for an index map is as follows. First, the number of index values for a CU may be signaled. Then, actual index values for the entire CU may be signaled using truncated binary (TB) coding. Both the number of indexes and the index values may be coded in a bypass mode. In this case, index-related bypass bins may be grouped together. Next, the palette mode ("INDEX" mode or "COPY_ABOVE" mode) and the run may be signaled in an interleaved manner. Finally, component escape values corresponding to escape samples for the entire CU may be grouped together and coded in the bypass mode. After signaling of the index values, an additional syntax element last_run_type_flag may be signaled. This syntax element does not need to signal the run value corresponding to the last run in the block, along with the number of indexes.

Meanwhile, in the VVC standard, a dual tree may be enabled for I slice that separates coding unit partitioning for luma and chroma. Palette coding (palette mode) can be applied to luma (Y component) and chroma (Cb and Cr component) individually or together. When the dual tree is disabled, palette coding (palette mode) can be applied to luma (Y component) and chroma (Cb and Cr component) together.

Figure 8:
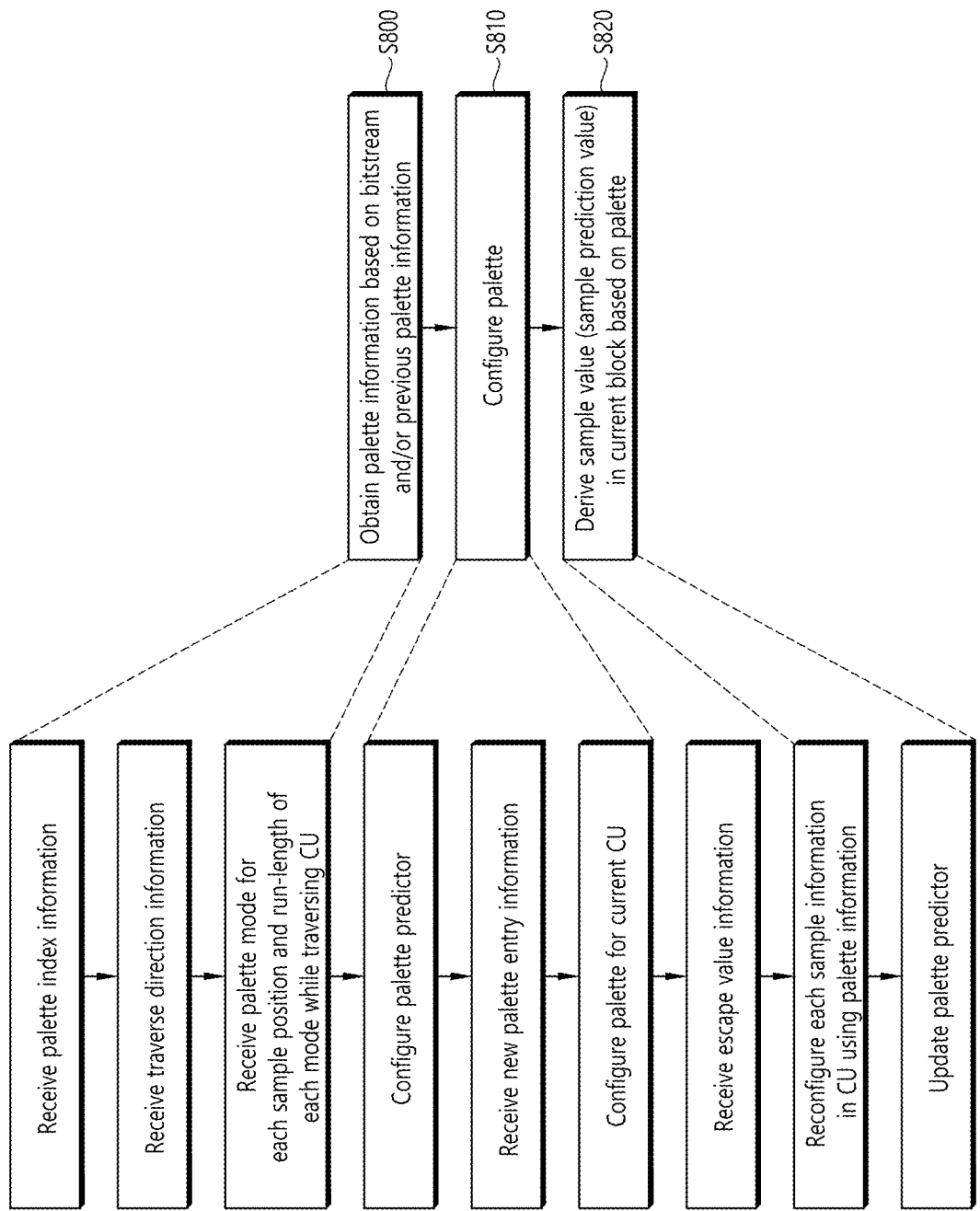
FIG. 8 is a diagram for describing an example of a palette mode based coding method.

FIG. 8 is a diagram for describing an example of a palette mode based coding method.

Referring to FIG. 8, a decoding apparatus may acquire palette information based on a bitstream and/or previous palette information (S800).

In one embodiment, the decoding apparatus may receive palette mode information with respect to each sample position and run-length information of each palette mode while traversing palette index information, traverse direction (scan order) information, and samples in the CU from the bitstream.

The decoding apparatus may configure a palette based on the palette information (S810).

In an embodiment, the decoding apparatus may configure a palette predictor. Palette information used in the previous block may be stored for the next palette CU (i.e., CU coded in the palette mode) to be generated later, and this may be defined as a palette predictor entry. The decoding apparatus may receive new palette entry information and configure a palette for the current CU. For example, after receiving received palette predictor reuse information and new palette entry information to be used in the current CU, the decoding apparatus may combine these two pieces of entry information to form one palette representing the current CU.

The decoding apparatus may derive sample values (sample prediction values) in the palette-based current block (S820).

In an embodiment, the decoding apparatus may configure samples from the obtained palette information while traversing samples in the CU in the horizontal direction or the vertical direction based on traverse direction (scan order) information. If palette mode information indicates the COPY_ABOVE mode, each sample value in the CU can be derived by copying the index information of the left sample position in the vertical scan and copying the index information of the upper sample position in the horizontal scan. That is, by deriving a color value of each sample from the configured palette table based on the index information of each sample in the CU, prediction samples in the CU can be derived. Then, the decoding apparatus may reconfigure each sample information in the CU using the palette information and update the palette predictor.

Meanwhile, the above-described palette coding (palette mode or palette coding mode) may signal information for indicating whether the current CU is coded in the palette mode and coding it by applying the palette mode thereto.

As an example, information on whether the palette coding mode is available may be signaled through a sequence parameter set (SPS) as shown in Table 1 below.

TABLE 1

|  | Descriptor |
| --- | --- |
| seq_parameter_set_rbsp( ) { | |
| ... | |
| sps_decoding_parameter_set_id | u(4) |
| if( chroma_format_idc = = 3 ) | |
| sps_palette_enabled_flag | u(1) |
| ... | |
| } | |

Semantics of syntax elements included in the syntax of Table 1 may be represented as shown in Table 2 below.

TABLE 2 sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0. Additionally, during the decoding of the coding unit (CU), a flag is enabled to indicate if the current CU is coded in the palette mode.

Referring to Tables 1 and 2, an sps_palette_enabled_flag syntax element may be parsed/signaled in the SPS. The sps_palette_enabled_flag syntax element may indicate whether the palette coding mode is available. For example, when the value of sps_palette_enabled_flag is 1, it can indicate that the palette coding mode is available, and in this case, information (e.g., pred_mode_plt_flag) indicating whether to apply the palette coding mode to the current coding unit in the coding unit syntax may be parsed/signaled. When the value of sps_palette_enabled_flag is 0, it can indicate that the palette coding mode is not available, and in this case, the information (e.g., pred_mode_plt_flag) indicating whether to apply the palette coding mode to the current coding unit in the coding unit syntax may not be parsed/signaled.

In addition, for example, information on whether to perform coding by applying the palette mode may be signaled based on the information on whether the palette coding mode is available (e.g., sps_palette_enabled_flag), and the information may be signaled through a coding unit syntax as shown in Table 3 below.

TABLE 3

|  | Descriptor |
| --- | --- |
| coding_unit( x0, y0, cbWidth, cbHeight, cqtDepth, treeType, modeType ) { <br>   chType = treeType = = DUAL_TREE_CHROMA? 1 : 0 <br>   if( slice_type != I \| \| sps_ibc_enabled_flag \| \| sps_palette_enabled_flag) { <br>     if( treeType != DUAL_TREE_CHROMA && <br>       !( ( ( cbWidth = = 4 && cbHeight = = 4 ) \| \| <br>       modeType = = MODE_TYPE_INTRA ) && !sps_ibc_enabled_flag ) ) <br>       cu_skip_flag[ x0 ][ y0 ] | ae(v) |
|     if( cu_skip_flag[ x0 ][ y0 ] = = 0 && slice_type != 1 <br>       && !( cbWidth = = 4 && cbHeight = = 4 ) && <br>       modeType = = MODE_TYPE_ALL ) <br>       pred_mode_flag | ae(v) |
|     if( ( ( slice_type = = I && cu_skip_flag[ x0 ][ y0 ] = =0 ) \| \| <br>       ( slice_type != I && ( CuPredMode[ chType ][ x0 ][ y0 ] != MODE_INTRA \| \| <br>       ( cbWidth = = 4 && cbHeight = = 4 && cu_skip_flag[ x0 ][ y0 ] = = 0 ) ) ) ) <br>       && cbWidth <= 64 && cbHeight <= 64 && <br>       modeType != MODE_TYPE_INTER && <br>       sps_ibc_enabled_flag && treeType != DUAL_TREE_CHROMA ) <br>       pred_mode_ibc_flag | ae(v) |
|     if( ( ( ( slice_type = = I \| \| ( cbWidth = = 4 && cbHeight = = 4 ) \| \| <br>       sps_ibc_enabled_flag ) && CuPredMode[ x0 ][ y0 ] = = MODE_INTRA) \| \| <br>       ( slice_type != I && !( cbWidth = = 4 && cbHeight = = 4 ) && <br>       !sps_ibc_enabled_flag && CuPredMode[ x0 ][ y0 ] != MODE_INTRA ) ) && <br>       sps_palette_enabled_flag && cbWidth <= 64 && cbHeight <= 64 && <br>       && cu_skip_flag[ x0 ][ y0 ] = = 0 && modeType != MODE_INTER ) <br>       pred_mode_plt_flag <br>   } <br>   if( CuPredMode[ chType ][ x0 ][ y0 ] = = MODE_INTRA \| \| <br>     CuPredMode[ chType ][ x0 ][ y0 ] = = MODE_PLT ) { <br>     if( treeType = = SINGLE_TREE \| \| treeType = = DUAL_TREE_LUMA ) { <br>       if( pred_mode_plt_flag ) { <br>         if( treeType = = DUAL_TREE_LUMA ) <br>           palette_coding( x0, y0, cbWidth, cbHeight, 0, 1 ) <br>         else /* SINGLE_TREE */ <br>           palette_coding( x0, y0, cbWidth, cbHeight, 0, 3 ) <br>       } <br> ... <br> } | ae(v) |

Semantics of syntax elements included in the syntax of Table 3 may be represented as shown in Table 4 below.

TABLE 4

| |
| --- |
| pred_mode_plt_flag specifies the use of palette mode in the current coding unit. <br> pred_mode_plt_flag equal to 1 indicates that palette mode is applied in the current coding unit. pred_mode_plt_flag equal to 0 indicates that palette mode is not applied in the current coding unit. When pred_mode_plt_flag is not present, it is inferred to be equal to 0. <br> When pred_mode_plt_flag is equal to 1, the variable CuPredMode[ x ][ y ] is set to be equal to MODE_PLT for x = x0..x0 + cbWidth − 1 and y = y0..y0 + cbHeight − 1. |

Referring to Tables 3 and 4, a pred_mode_plt_flag syntax element may be parsed/signaled in the coding unit syntax. The pred_mode_plt_flag syntax element may indicate whether the palette mode is applied to the current coding unit. For example, when the value of pred_mode_plt_flag is 1, it can indicate that the palette mode is applied to the current coding unit, and if the value of pred_mode_plt_flag is 0, it can indicate that the palette mode is not applied to the current coding unit.

In this case, pred_mode_plt_flag may be parsed/signaled based on information (e.g., sps_palette_enabled_flag) on whether the palette coding mode is available. For example, when the value of sps_palette_enabled_flag is 1 (i.e., when the palette coding mode is available), pred_mode_plt_flag can be parsed/signaled.

In addition, coding may be performed by applying the palette mode to the current coding unit based on pred_mode_plt_flag. For example, when the value of pred_mode_plt_flag is 1, the palette mode can be applied to the current coding unit to generate a reconstructed sample by parsing/signaling the palette_coding( ) syntax.

As an example, Table 5 below shows a palette coding syntax.

TABLE 5

| | Descriptor |
|---|---|
| palette_coding( x0, y0, cbWidth, cbHeight, startComp, numComps ) { | |
|   palettePredictionFinished = 0 | |
|   NumPredictedPaletteEntries = 0 | |
|   for( predictorEntryIdx = 0; predictorEntryIdx < PredictorPaletteSize[ startComp ] && | |
|     !palettePredictionFinished && | |
|     NumPredictedPaletteEntries[ startComp ] < palette_max_size; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ae(v) |
|   for( cIdx = startComp; cIdx < ( startComp + numComps); cIdx++ ) | |
|     for( i = 0; i < num_signalled_palette_entries; i++ ) | |
|       new_palette_entries[ cIdx ][ i ] | ae(v) |
|   if( CurrentPaletteSize[ startComp ] > 0 ) | |
|     palette_escape_val_present_flag | ae(v) |
|   if( MaxPaletteIndex > 0 ) { | |
|     num_palette_indices_minus1 | ae(v) |
|     adjust = 0 | |
|     for( i = 0; i <= num_palette_indices_minus1; i++ ) { | |
|       if( MaxPaletteIndex − adjust > 0 ) { | |
|         palette_idx_idc | ae(v) |
|         PaletteIndexIdc[ i ] = palette_idx_idc | |
|       } | |
|       adjust = 1 | |
|     } | |
|     copy_above_indices_for_final_run_flag | ae(v) |
|     palette_transpose_flag | ae(v) |
|   } | |
|   if( treeType != DUAL_TREE_CHROMA && palette_escape_val_present_flag ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
|   if( treeType != DUAL_TREE_LUMA && palette_escape_val_present_flag ) { | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag ) | |
|         cu_chroma_qp_offset_idx | ae(v) |
|     } | |
|   } | |
|     remainingNumIndices = num_palette_indices_minus1 + 1 | |
|     PaletteScanPos = 0 | |
|     log2CbWidth = Log2( cbWidth ) | |
|     log2CbHeight = Log2( cbHeight ) | |
|     while( PaletteScanPos < cbWidth*cbHeightt ) { | |
|       xC = x0 + TraverseScanOrder[ log2CbWidth ][ log2CbHeight ][ PaletteScanPos ][ 0 ] | |
|       yC = y0 + TraverseScanOrder[ log2CbWidth ][ log2CbHeight ][ PaletteScanPos ][ 1 ] | |
|       if( PaletteScanPos > 0 ) { | |
|         xcPrev = | |

TABLE 5-continued

| | Descriptor |
|---|---|

```
            x0 + TraverseScanOrder[ log2CbWidth ][ log2CbHeight ][ PaletteScanPos − 1 ][ 0 ]
              ycPrev =
          y0 + TraverseScanOrder[ log2CbWidth ][ log2CbHeight ][ PaletteScanPos − 1 ] [ 1 ]
          }
          PaletteRunMinus1 = cbWidth * cbHeight − PaletteScanPos − 1
          RunToEnd = 1
          CopyAboveIndicesFlag[ xC ][ yC ] = 0
          if( MaxPaletteIndex > 0 )
            if( ( ( !palette_transpose_flag && yC > 0 ) | | ( palette_transpose_flag && xC
       > 0 ) )
                 && CopyAboveIndicesFlag[ xcPrev ][ ycPrev ] = = 0 )
              if( remainingNumIndices > 0 && PaletteScanPos < cbWidth* cbHeight − 1 ) {
                copy_above_palette_indices_flag                                                   ae(v)
                CopyAboveIndicesFlag[ xC ][ yC ] = copy_above_palette_indices_flag
              } else {
                if( PaletteScanPos = = cbWidth * cbHeight − 1 && remainingNumIndices >
       0 )
                    CopyAboveIndicesFlag[ xC ][ yC ] = 0
                  else
                    CopyAboveIndicesFlag[ xC ][ yC ] = 1
              }
          if( CopyAboveIndicesFlag[ xC ][ yC ] = = 0 ) {
            currNumIndices = num_palette_indices_minus1 + 1 − remainingNumIndices
            PaletteIndexMap[ xC ][ yC ] = PaletteIndexIdc[ currNumIndices ]
          }
          if( MaxPaletteIndex > 0 ) {
            if( CopyAboveIndicesFlag[ xC ][ yC ] = = 0 )
              remainingNumIndices − = 1
            if( remainingNumIndices > 0 | | CopyAboveIndicesFlag[ xC ][ yC ] !=
                copy_above_indices_for_final_run_flag ) {
              PaletteMaxRunMinus1 = cbWidth * cbHeight − PaletteScanPos − 1 −
                remainingNumIndices − copy_above_indices_for_final_run_flag
              RunToEnd = 0
              if( PaletteMaxRunMinus1 > 0 ) {
                palette_run_prefix                                                                ae(v)
                if( ( palette_run_prefix > 1 ) && ( PaletteMaxRunMinus1 !=
                  ( 1 << ( palette_run_prefix − 1 ) ) ) )
                  palette_run_suffix                                                              ae(v)
              }
            }
          }
          runPos = 0
          while ( runPos <= PaletteRunMinus1 ) {
            xR = x0 + TraverseScanOrder[ log2CbWidth ][ log2CbHeight ][ PaletteScanPos ][ 0 ]
            yR = y0 + TraverseScanOrder[ log2CbWidth ][ log2CbHeight ][ PaletteScanPos ][ 1 ]
            if( CopyAboveIndicesFlag[ xC ][ yC ] = = 0 ) {
              CopyAboveIndicesFlag[ xR ][ yR ] = 0
              PaletteIndexMap[ xR ][ yR ] = PaletteIndexMap[ xC ][ yC ]
            } else {
              CopyAboveIndicesFlag[ xR ][ yR ] = 1
              if( !palette_transpose_flag )
                PaletteIndexMap[ xR ][ yR ] = PaletteIndexMap[ xR ][ yR − 1 ]
              else
                PaletteIndexMap[ xR ][ yR ] = PaletteIndexMap[ xR − 1 ][ yR ]
            }
            runPos++
            PaletteScanPos ++
          }
        }
        if( palette_escape_val_present_flag ) {
          for( cIdx = startComp; cIdx < ( startComp + numComps ); cIdx++ )
            for( sPos = 0; sPos < cbWidth* cbHeight; sPos++ ) {
              xC = x0 + TraverseScanOrder[ log2CbWidth][ log2CbHeight ][ sPos ][ 0 ]
              yC = y0 + TraverseScanOrder[ log2CbWidth][ log2CbHeight ][ sPos ][ 1 ]
              if( PaletteIndexMap[ cIdx ][ xC ][ yC ] = = MaxPaletteIndex ) {
                palette_escape_val                                                                ae(v)
                PaletteEscapeVal[ cIdx ][ xC ][ yC ] = palette_escape_val
              }
            }
        }
      }
```

Semantics of syntax elements included in the syntax of Table 5 may be represented as shown in Table 6 below.

TABLE 6

In the following semantics, the array indices x0, y0 specify the location ( x0, y0 ) of the top-left luma sample of the considered coding block relative to the top-left luma sample of the picture. The array indices xC, yC specify the location ( xC, yC ) of the sample relative to the top-left luma sample of the picture. The array index startComp specifies the first colour component of the current palette table. startComp equal to 0 indicates the Y component; startComp equal to 1 indicates the Cb component; startComp equal to 2 indicates the Cr component. numComps specifies the number of colour components in the current palette table.
The predictor palette consists of palette entries from previous coding units that are used to predict the entries in the current palette.
The variable PredictorPaletteSize[ startComp ] specifies the size of the predictor palette for the first colour component of the current palette table startComp. PredictorPaletteSize is derived as specified in Section 1.4
The variable PalettePredictorEntryReuseFlags[ i ] equal to 1 specifies that the i-th entry in the predictor palette is reused in the current palette. PalettePredictorEntryReuseFlags[ i ] equal to 0 specifies that the i-th entry in the predictor palette is not an entry in the current palette. All elements of the array PalettePredictorEntryReuseFlags[ i ] are initialized to 0. palette_predictor_run is used to determine the number of zeros that precede a non-zero entry in the array PalettePredictorEntryReuseFlags.
It is a requirement of bitstream conformance that the value of palette_predictor_run shall be in the range of 0 to ( PredictorPaletteSize − predictorEntryIdx ), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to palette_max_size, inclusive.
num_signalled_palette_entries specifies the number of entries in the current palette that are explicitly signalled for the first colour component of the current palette table startComp. When num_signalled_palette_entries is not present, it is inferred to be equal to 0.
The variable CurrentPaletteSize[ startComp ] specifies the size of the current palette for the first colour component of the current palette table startComp and is derived as follows:
        CurrentPaletteSize[ startComp ] = NumPredictedPaletteEntries +
        num_signalled_palette_entries
The value of CurrentPaletteSize[ startComp ] shall be in the range of 0 to palette_max_size, inclusive.
new_palette_entries[ cIdx ][ i ] specifies the value for the i-th signalled palette entry for the colour component cIdx.
The variable PredictorPaletteEntries[ cIdx ][ i ] specifies the i-th element in the predictor palette for the colour component cIdx.
The variable CurrentPaletteEntries[ cIdx ][ i ] specifies the i-th element in the current palette for the colour component cIdx and is derived as follows:
    numPredictedPaletteEntries = 0
    for( i = 0; i < PredictorPaletteSize[ startComp ]; i++ )
        if( PalettePredictorEntryReuseFlags[ i ] ) {
            for( cIdx =startComp; cIdx < ( startComp + numComps ); cIdx++ )
                CurrentPaletteEntries[ cIdx ][ numPredictedPaletteEntries ] =
    PredictorPaletteEntries[ cIdx ][ i ]
        numPredictedPaletteEntries++
        }
    for( cIdx = startComp; cIdx < (startComp + numComps); cIdx++)
        for( i = 0; i < num_signalled_palette_entries[startComp]; i++ )
            CurrentPaletteEntries[ cIdx ][ numPredictedPaletteEntries + i ] =
    new_palette_entries[ cIdx ][ i ]
palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.
The variable MaxPaletteIndex specifies the maximum possible value for a palette index for the current coding unit. The value of MaxPaletteIndex is set equal to CurrentPaletteSize[ startComp ] − 1 + palette_escape_val_present_flag.
num_palette_indices_minus1 plus 1 is the number of palette indices explicitly signalled or inferred for the current block.
When num_palette_indices_minus1 is not present, it is inferred to be equal to 0.
palette_idx_idc is an indication of an index to the palette table, CurrentPaletteEntries. The value of palette_idx_idc shall be in the range of 0 to MaxPaletteIndex, inclusive, for the first index in the block and in the range of 0 to ( MaxPaletteIndex − 1 ), inclusive, for the remaining indices in the block.
When palette_idx_idc is not present, it is inferred to be equal to 0.
The variable PaletteIndexIdc[ i ] stores the i-th palette_idx_idc explicitly signalled or inferred. All elements of the array PaletteIndexIdc[ i ] are initialized to 0.
copy_above_indices_for_final_run_flag equal to 1 specifies that the palette indices of the last positions in the coding unit are copied from the palette indices in the row above if horizontal traverse scan is used or the palette indices in the left column if vertical traverse scan is used. copy_above_indices_for_final_run_flag equal to 0 specifies that the palette indices of the last positions in the coding unit are copied from PaletteIndexIdc[ num_palette_indices_minus1 ].
When copy_above_indices_for_final_run_flag is not present, it is inferred to be equal to 0.
palette_transpose_flag equal to 1 specifies that vertical traverse scan is applied for scanning TABLE 6-continued the indices for samples in the current coding unit. palette_transpose_flag equal to 0 specifies
that horizontal traverse scan is applied for scanning the indices for samples in the current
coding unit. When not present, the value of palette_transpose_flag is inferred to be equal to
0.
The array TraverseScanOrder specifies the scan order array for palette coding.
TraverseScanOrder is assigned the horizontal scan order HorTravScanOrder if
palette_transpose_flag is equal to 0 and TraverseScanOrder is assigned the vertical scan
order VerTravScanOrder if if palette_transpose_flag is equal to 1.
copy_above_palette_indices_flag equal to 1 specifies that the palette index is equal to the
palette index at the same location in the row above if horizontal traverse scan is used or the
same location in the left column if vertical traverse scan is used.
copy_above_palette_indices_flag equal to 0 specifies that an indication of the palette index
of the sample is coded in the bitstream or inferred.
The variable CopyAboveIndicesFlag[ xC ][ yC ] equal to 1 specifies that the palette index is
copied from the palette index in the row above (horizontal scan) or left column (vertical
scan). CopyAboveIndicesFlag[ xC ][ yC ] equal to 0 specifies that the palette index is
explicitly coded in the bitstream or inferred. The array indices xC, yC specify the location
( xC, yC ) of the sample relative to the top-left luma sample of the picture. The value of
PaletteIndexMap[ xC ][ yC ] shall be in the range of 0 to ( MaxPaletteIndex − 1), inclusive.
The variable PaletteIndexMap[ xC ][ yC ] specifies a palette index, which is an index to the
array represented by CurrentPaletteEntries. The array indices xC, yC specify the location
( xC, yC ) of the sample relative to the top-left luma sample of the picture. The value of
PaletteIndexMap[ xC ][ yC ] shall be in the range of 0 to MaxPaletteIndex, inclusive.
The variable adjustedRefPaletteIndex is derived as follows:
    adjustedRefPaletteIndex = MaxPaletteIndex + 1
    if( PaletteScanPos > 0 ) {
        xcPrev =
    x0 + TraverseScanOrder[ log2CbWidth ][ log2bHeight ][ PaletteScanPos − 1 ][ 0 ]
        ycPrev =
    y0 + TraverseScanOrder[ log2CbWidth ][ log2bHeight ][ PaletteScanPos − 1 ][ 1 ]
        if( CopyAboveIndicesFlag[ xcPrev ][ ycPrev ] = = 0 ) {
          adjustedRefPaletteIndex = PaletteIndexMap[ xcPrev ][ ycPrev ] {
        }
        else {
          if( !palette_transpose_flag )
            adjustedRefPaletteIndex = PaletteIndexMap[ xC ][ yC − 1 ]
          else
            adjustedRefPaletteIndex = PaletteIndexMap[ xC − 1 ][ yC ]
        }
    }
When CopyAboveIndicesFlag[ xC ][ yC ] is equal to 0, the variable CurrPaletteIndex is
derived as follows:
    if( CurrPaletteIndex >= adjustedRefPaletteIndex )
        CurrPaletteIndex++
palette_run_prefix, when present, specifies the prefix part in the binarization of
PaletteRunMinus1.
palette_run_suffix is used in the derivation of the variable PaletteRunMinus1. When not
present, the value of palette_run_suffix is inferred to be equal to 0.
When RunToEnd is equal to 0, the variable PaletteRunMinus1 is derived as follows:
-    If PaletteMaxRunMinus1 is equal to 0, PaletteRunMinus1 is set equal to 0.
-    Otherwise (PaletteMaxRunMinus1 is greater than 0) the following applies:
    -    If palette_run_prefix is less than 2, the following applies:
        PaletteRunMinus1=palette_run_prefix
    -    Otherwise (palette_run_prefix is greater than or equal to 2), the following applies:
        PrefixOffset = 1 << ( palette_run_prefix − 1 )
        PaletteRunMinus1 = PrefixOffset + palette_run_suffix
The variable PaletteRunMinus1 is used as follows:
-    If CopyAboveIndicesFlag[ xC ][ yC ] is equal to 0, PaletteRunMinus1 specifies the
    number of consecutive locations minus 1 with the same palette index.
-    Otherwise if palette_transpose_flag equal to 0, PaletteRunMinus1 specifies the number
    of consecutive locations minus 1 with the same palette index as used in the correspond-
    ing
    position in the row above.
-    Otherwise, PaletteRunMinus1 specifies the number of consecutive locations minus 1
    with the same palette index as used in the corresponding position in the left column.
When RunToEnd is equal to 0, the variable PaletteMaxRunMinus1 represents the maximum
possible value for PaletteRunMinus1 and it is a requirement of bitstream conformance that
the value of PaletteMaxRunMinus1 shall be greater than or equal to 0.
palette_escape_val specifies the quantized escape coded sample value for a component.
The variable PaletteEscapeVal[ cIdx ][ xC ][ yC ] specifies the escape value of a sample for
which PaletteIndexMap[ xC ][ yC ] is equal to MaxPaletteIndex and
palette_escape_val_present_flag is equal to 1. The array index cIdx specifies the colour
component. The array indices xC, yC specify the location ( xC, yC ) of the sample relative
to the top-left luma sample of the picture.
It is a requirement of bitstream conformance that PaletteEscapeVal[ cIdx ][ xC ][ yC ] shall
be in the range of 0 to $(1 << ( BitDepth_Y + 1 ) ) - 1$, inclusive, for cIdx equal to 0, and in
the range of 0 to $(1 << ( BitDepth_C + 1 ) ) - 1$, inclusive, for cIdx not equal to 0.

Referring to Tables 5 and 6, when the palette mode is applied to the current block (i.e., the current coding unit), the palette coding syntax (e.g., palette_coding( )) as in Table 5 may be parsed/signaled.

For example, a palette table can be configured based on palette entry information. The palette entry information may include syntax elements such as palette_predictor_run, num_signalled_palette_entries, and new_palette_entries.

In addition, it is possible to configure a palette index map for the current block based on the palette index information. The palette index information may include syntax elements such as num_palette_indices_minus1, palette_idx_idc, copy_above_indices_for_final_run_flag, and palette_transpose_flag. Based on the palette index information as described above, it is possible to derive palette index values (e.g., PaletteIndexIdc) for the samples in the current block while traversing in the traverse scan direction (vertical direction or horizontal direction) to configure the palette index map (e.g., PaletteIndexMap).

In addition, it is possible to derive a sample value for a palette entry in the palette table based on the palette index map and generate reconstructed samples of the current block based on the sample value (i.e., color value) mapped to the palette entry.

When a sample having an escape value in the current block (i.e., when the value of palette_escape_val_present_flag is 1), an escape value for the current block may be derived based on escape information. The escape information may include syntax elements such as palette_escape_val_present_flag and palette_escape_val. For example, an escape value for an escape-coded sample in the current block may be derived based on quantized escape value information (e.g., palette_escape_val). Reconstructed samples of the current block may be generated based on the escape value.

As described above, information (syntax elements) in the syntax table disclosed in the present disclosure may be included in image/video information, configured/encoded according to the coding technique (including palette coding) performed in the encoding apparatus and delivered to the decoding apparatus in the form of a bitstream. The decoding apparatus may parse/decode the information (syntax elements) in the syntax table. The decoding apparatus may perform a coding technique such as palette coding based on the decoded information and may perform a block/image/video reconstruction (decoding) procedure based thereon. Hereinafter, the present disclosure proposes a syntax table and syntax elements for efficiently coding a block/image/video based on palette coding.

The present disclosure proposes a method of efficiently coding and signaling escape values in palette mode coding. In the palette mode, escape values may be used to additionally transmit a corresponding sample value for a sample having a value different from those of neighboring samples in a block. Since such escape values are additional data, quantization may be performed to save the escape values. In addition, in escape coding in the palette mode, no transform is applied and a quantized escape value may be directly signaled. This can be considered to be similar to the transform skip mode in which no transform is applied to a coding unit (CU).

In the current VVC standard, a full range of quantization parameters (QP) values are applied to escape values in the palette mode. However, the present disclosure proposes a method of limiting the range of QP values in order to prevent a quantization step size for escape value coding in the palette mode from becoming smaller than 1. In one embodiment, the same constraint as a minimum QP for transform skip may be applied to escape value coding in the palette mode. A minimum QP for the palette mode may be clipped using the minimum QP for the transform skip.

As an example, information on the minimum QP for transform skip may be signaled through a sequence parameter set (SPS) as shown in Table 7 below.

TABLE 7

| | Descriptor |
|---|---|
| seq_parameter_set_rbsp( ) { | |
|   sps_decoding_parameter_set_id | u(4) |
|   ..... | |
|   min_qp_prime_ts_minus4 | ue(v) |
|   .... | |
|   if( chroma_format_idc = = 3 ) | |
|     sps_palette_enabled_flag | u(1) |
|   ... | |
| } | |

Semantics of syntax elements included in the syntax of Table 7 may be represented as shown in Table 8 below.

TABLE 8 min_qp_prime_ts_minus4 specifies the minimum allowed quantization parameter for transform skip mode as follows:
QpPrimeTsMin = 4 + min_qp_prime_ts_minus4
min_qp_prime_ts_minus4 is signalled in the SPS and is typically given by 6*(inputBitDepth − 8).

Referring to Tables 7 and 8, a min_qp_prime_ts_minus4 syntax element may be parsed/signaled in the SPS. The min_qp_prime_ts_minus4 syntax element can indicate a minimum quantization parameter allowed for the transform skip mode. In other words, a minimum quantization parameter value (e.g., QpPrimeTsMin) in the transform skip mode may be derived based on the min_qp_prime_ts_minus4 syntax element. For example, the minimum quantization parameter value (e.g., QpPrimeTsMin) can be derived by adding 4 to the value of min_qp_prime_ts_minus4.

As described above, based on the min_qp_prime_ts_minus4 syntax element signaled through the SPS, the QP for escape values in the palette mode may be derived as in the algorithm disclosed in Table 9 below. That is, the QP value used for escape value reconfiguration in the palette mode based decoding process can be derived as in the algorithm disclosed in Table 9 below.

TABLE 9

- Otherwise (bIsEscapeSample is equal to 1 and cu_transquant_bypass_flag is equal to 0),
  the following ordered steps apply:
  1. The quantization parameter qP is derived as follows:
     - If cIdx is equal to 0,
       qP = Max( QpPrimeTsMin, Qp'Y )
     - Otherwise, if cIdx is equal to 1,
       qP = Max( QpPrimeTsMin, Qp'Cb)
     - Otherwise (cIdx is equal to 2),
       qP = Max( QpPrimeTsMin, Qp'Cr)
  2. The variables bitDepth is derived as follows:
       bitDepth = ( cIdx = = 0 ) ? BitDepth$_Y$ : BitDepth$_C$
  3. The list levelScale[ ] is specified as level Scale[ k ] = { 40, 45, 51, 57, 64, 72 } with k = 0..5.
  4. The following applies:
       tmpVal = ( PaletteEscapeVal[ cIdx ][ xCb + xL ][ yCb + yL ] *
         levelScale[ qP%6 ] ) << ( qP / 6 ) + 32 ) >> 6
       recSamples[ x ][ y ] = Clip3( 0, ( 1 << bitDepth ) − 1, tmpVal )

Referring to Table 9, when an escape value of the palette mode exists, a QP value may be derived. That is, QP for the escape value of the palette mode may be derived based on the minimum quantization parameter value (e.g., QpPrimeTsMin) in the transform skip mode derived based on the min_qp_prime_ts_minus4 syntax element described above. For example, as shown in Table 9, the QP for escape values of the palette mode may be derived as a larger value between QpPrimeTsMin and a quantization parameter Qp (Qp'Y for a luma component and Qp'Cb or Qp'Cr for a chroma component). Then, an escape value may be derived based on the QP for escape values of the palette mode to reconstruct samples in a block.

In addition, in the present disclosure, as described above, when the QP range in the palette mode is limited to be greater than or equal to the minimum quantization parameter value (e.g., QpPrimeTsMin) in the transform skip mode, the range of escape values quantized in the palette mode may be limited. As an embodiment, the range of escape values quantized in the palette mode may be determined based on bitdepth and may be limited such that it is not greater than, for example, (1<<BitDepth)−1.

For example, an escape value quantized in the palette mode may be represented by a syntax element palette_escape_val. The syntax element palette_escape_val may be signaled through a palette coding syntax as shown in Table 10 below.

TABLE 10

| | Descriptor |
|---|---|
| palette_coding( x0, y0, cbWidth, cbHeight, treeType ) { | |
| ..... | |
|   if( palette_escape_val_present_flag ) { | |
|     for( cIdx = startComp; cIdx < ( startComp + numComps ); cIdx++ ) { | |
|       for( sPos = minSubPos; sPos < maxSubPos; sPos++ ) { | |
|         xC = x0 + TraverseScanOrder[ log2CbWidth][ log2CbHeight ][ sPos ][ 0 ] | |
|         yC = y0 + TraverseScanOrder[ log2CbWidth][ log2CbHeight ][ sPos ][ 1 ] | |
|         if( !( treeType = = SINGLE_TREE && cIdx != 0 && | |
|           ( xC % SubWidthC != 0 \|\| yC % SubHeightC != 0 ) ) ) { | |
|           if( PaletteIndexMap[ cIdx ][ xC ][ yC ] = = MaxPaletteIndex ) { | |
|             palette_escape_val | ae(v) |
|             PaletteEscapeVal[ cIdx ][ xC ][ yC ] = palette_escape_val | |
|           } | |
|         } | |
|       } | |
|     } | |
|   } | |
| } | |

Semantics of syntax elements included in the syntax of Table 10 may be represented as shown in Table 11 below.

TABLE 11 palette_escape_val specifies the quantized escape coded sample value for a component.
The variable PaletteEscapeVal[ cIdx ][ xC ][ yC ] specifies the escape value of a sample for which PaletteIndexMap[ xC ][ yC ] is equal to MaxPaletteIndex and palette_escape_val_present_flag is equal to 1. The array index cIdx specifies the colour component. The array indices xC, yC specify the location ( xC, yC ) of the sample relative to the top-left luma sample of the picture.
It is a requirement of bitstream conformance that PaletteEscapeVal[ cIdx ][ xC ][ yC ] shall be in the range of 0 to $(1 << ( BitDepth_Y ) ) - 1$, inclusive, for cIdx equal to 0, and in the range of 0 to $(1 << ( BitDepth_C ) ) - 1$, inclusive, for cIdx not equal to 0.

Referring to Tables 10 and 11, a palette_escape_val syntax element may be parsed/signaled in the palette coding syntax. The palette_escape_val syntax element can indicate a quantized escape value. In addition, as shown in Table 10, the value of the syntax element palette_escape_val may be set to PaletteEscape Val, and PaletteEscape Val can indicate an escape value of a sample in which the palette index map (PaletteIndexMap) is equal to the maximum palette index (MaxPaletteIndex) and the value of palette_escape_val_present_flag is 1. Here, the case where the value of palette_escape_val_present_flag is 1 may mean that at least one escape-coded sample (escape value) is included in the current CU. For example, for a luma component, PaletteEscape Val may be limited to a range from 0 to (1<<(BitDepth Y)–1). For a chroma component, PaletteEscapeVal may be limited to a range from 0 to (1<<(BitDepthC))–1.

In addition, the present disclosure proposes a method of defining a palette size and signaling the same. The palette size may indicate the number of entries in the palette table (i.e., the number of indexes in the palette table). As an embodiment, in the present disclosure, the number of entries in the palette may be indicated by defining the palette size by one or more constants.

As an example, the palette size may be represented by a syntax element palette_max_size, and the syntax element palette_max_size may be the same for the entire sequence or may be different according to a CU size (i.e., the number of pixels in a CU). For example, the palette size (palette_max_size) may indicate the maximum allowable index of the palette table and may be defined as 31. As another example, the palette size (palette_max_size) may indicate the maximum allowable index of the palette table, and may be defined as shown in Table 12 below according to the CU size.

TABLE 12 if (cbWidth*cbHeight>=1024)
   palette_max_size is defined as 63
else if cbWidth*cbHeight>=256
   palette_max_size is defined as 31
else
   palette_max_size is defined as 15

The palette sizes 63, 31, 15, etc., and the CU sizes 1024, 256, etc. disclosed in Table 12 are only used as examples and may be changed to other numbers.

As an embodiment, information indicating the palette size (e.g., palette_max_size) may be signaled through an SPS as shown in Table 13 below.

TABLE 13

| | Descriptor |
|---|---|
| seq_parameter_set_rbsp( ) { | |
|   sps_decoding_parameter_set_id | u(4) |
|   ..... | |
|   if( chroma_format_idc = = 3 ) { | |
|     sps_palette_enabled_flag | u(1) |
|     if (sps_palette_enabled_flag) | |
|       palette_max_size | u(6) |
|     } | |
|   ... | |
| } | |

Semantics of syntax elements included in the syntax of Table 13 may be represented as shown in Table 14 below.

TABLE 14 palette_max_size specifies the maximum allowed index of the palette table, and shall be in the range of 1 to 63 inclusive.

Referring to Tables 13 and 14 above, a palette_max_size syntax element may be parsed/signaled in the SPS. The palette_max_size syntax element can indicate the maximum allowable index of the palette table and may be limited to a range from 1 to 63.

In this case, the palette_max_size syntax element may be parsed/signaled based on an sps_palette_enabled_flag syntax element, which is information for indicating whether the palette mode is enabled. For example, when the value of sps_palette_enabled_flag is 1 (i.e., when it indicates that the palette mode is enabled), the palette_max_size syntax element may be parsed/signaled.

Alternatively, as an embodiment, information indicating a palette size (e.g., log 2_palette_max_size) may be signaled through an SPS as shown in Table 15 below.

TABLE 15

| | Descriptor |
|---|---|
| seq_parameter_set_rbsp( ) { | |
|   sps_decoding_parameter_set_id | u(4) |
|   ...... | |
|   if( chroma_format_idc = = 3 ) { | |
|     sps_palette_enabled_flag | u(1) |
|     if (sps_palette_enabled_flag) | |
|       log2_palette_max_size | u(3) |
|   } | |
|   ... | |
| } | |

Semantics of syntax elements included in the syntax of Table 15 may be represented as shown in Table 16 below.

TABLE 16 log2_palette_max_size specifies the log2 of (palette_max_size+1). palette_max_size=(1<<log2_palette_max_size)−1. palette_max_size specifies the the maximum allowed index of the palette table, and shall be in the range of 1 to 63 inclusive.

Referring to Tables 15 and 16, a log 2_palette_max_size syntax element may be parsed/signaled in the SPS. The log 2_palette_max_size syntax element can indicate a log 2 value of the palette size (i.e., palette_max_size+1). Accordingly, palette_max_size indicating the maximum allowable index of the palette table may be derived by calculating (1<<log 2_palette_max_size)−1 and may be limited to a range from 1 to 63.

In this case, the log 2_palette_max_size syntax element may be parsed/signaled based on the sps_palette_enabled_flag syntax element, which is information for indicating whether the palette mode is enabled. For example, when the value of sps_palette_enabled_flag is 1 (i.e., when it indicates that the palette mode indicates is enabled), the log 2_palette_max_size syntax element may be parsed/signaled.

Alternatively, as an embodiment, information indicating a palette size (e.g., log 2_palette_CU_size_TH1, log 2_palette_max_size_TH1, log 2_palette_max_size_default) may be signaled through an SPS as shown in Table 17 below.

TABLE 17

| | Descriptor |
|---|---|
| seq_parameter_set_rbsp( ) { | |
|   sps_decoding_parameter_set_id | u(4) |
|   ..... | |
|   if( chroma_format_idc = = 3 ) { | |
|     sps_palette_enabled_flag | u(1) |
|     if (sps_palette_enabled_flag) { | |
|       log2_palette_CU_size_TH1 | u(5) |
|       log2_palette_max_size_TH1 | u(3) |
|         log2_palette_max_size_default | u(3) |
|     } | |
|   ... | |
| } | |

Semantics of syntax elements included in the syntax of Table 17 may be represented as shown in Table 18 below.

TABLE 18 log2_Palette_CU_size_TH1 specfies the log2 of the size limit of palette_max_size_TH1. Palette_CU_size_TH1=1<< log2_Palette_CU_size_TH1
log2_palette_max_size_TH1 specifies the log2 of (palette_max_size_TH1+1) palette_max_size_TH1=(1<< log2_palette_max_size_TH1)-1. palette_max_size_TH1 specifies the maximum allowed index of the palette table for CU with size greater than Palette_CU_size_TH1, and shall be in the range of 1 to 63 inclusive.
log2_palette_max_size_default specifies the log2 of (palette_max_size_default+1). palette_max_size_default=(1<< log2_palette_max_size_default)-1. palette_max_size_default specifies the maximum allowed index of the palette table, and shall be in the range of 1 to 63 inclusive.
Variable palette_max_size specifies the maximum allowed index of a palette table, and is derived as follows:
If (cbWidth*cbHeight >= Palette_CU_size_TH1)
  palette_max_size = palette_max_size_TH1
else
  palette_max_size = palette_max_size_default Referring to Tables 17 and 18, log 2_palette_CU_size_TH1, log 2_palette_max_size_TH1, and log 2_palette_max_size_default syntax elements may be parsed/signaled in the SPS.

The log 2_palette_CU_size_TH1 syntax element indicates a log 2 value of a size limit of palette_max_size_TH1, and palette_max_size_TH1 may be derived as 1<<log 2_Palette_CU_size_TH1.

The log 2_palette_max_size_TH1 syntax element indicates a log 2 value of (palette_max_size_TH1+1), and palette_max_size_TH1 may be derived as (1<<log 2_palette_max_size_TH1)-1. palette_max_size_TH1 indicates the maximum allowable index of the palette table for a CU having a size larger than Palette_CU_size_TH1 and may be limited within the range of 1 to 63.

The log 2_palette_max_size_default syntax element indicates a log 2 value of (palette_max_size_default+1), and palette_max_size_default may be derived as (1<<log 2_palette_max_size_default)-1. palette_max_size_default indicates the maximum allowable index of the palette table and may be limited within the range of 1 to 63.

Here, the log 2_palette_CU_size_TH1, log 2_palette_max_size_TH1, and log 2_palette_max_size_default syntax elements may be parsed/signaled based on the sps_palette_enabled_flag syntax element, which is information for indicating whether the palette mode is enabled. For example, when the value of sps_palette_enabled_flag is 1 (i.e., when it indicates that the palette mode is enabled), the log 2_palette_CU_size_TH1, log 2_palette_max_size_TH1, and log 2_palette_max_size_default syntax elements may be parsed/signaled.

Also, one or more sets of palette_CU_size_TH and palette_max_size_TH may be signaled and used to indicate palette_max_size.

The following drawings were created to explain a specific example of the present disclosure. The names or specific terms or names of specific devices illustrated in the drawings (e.g., the names of syntax/syntax elements, etc.) are presented by way of example, and thus the technical features of the present disclosure are not limited to the specific names used in the drawings below.

Figure 9:
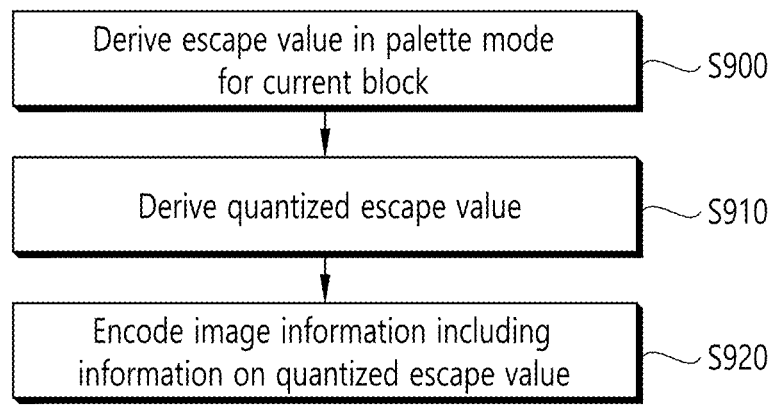
FIG. 9 schematically shows an example of a video/image encoding method according to embodiment(s) of the present disclosure.

FIG. 9 schematically shows an example of a video/image encoding method according to embodiment(s) of the present disclosure.

The method disclosed in FIG. 9 may be performed by the encoding apparatus 200 illustrated in FIG. 2. Specifically, steps S900 and S910 of FIG. 9 may be performed by the predictor 220 illustrated in FIG. 2, and step S920 of FIG. 9 may be performed by the entropy encoder 240 illustrated in FIG. 2. Further, the method disclosed in FIG. 9 may include the embodiments described above in the present disclosure. Accordingly, in FIG. 9, detailed description of redundant parts of FIG. 9 and the above-described embodiments will be omitted or simplified.

Referring to FIG. 9, the encoding apparatus may derive an escape value in the palette mode for the current block (S900).

As an embodiment, the encoding apparatus may determine a prediction mode for the current block and perform prediction. For example, the encoding apparatus may determine whether to perform inter prediction or intra prediction on the current block. Alternatively, the encoding apparatus may determine whether to perform prediction on the current block based on CIIP mode, IBC mode, or palette mode. The encoding apparatus may determine the prediction mode based on RD cost. The encoding apparatus may perform prediction according to the determined prediction mode to derive prediction samples for the current block. Further, the encoding apparatus may generate and encode information (e.g., prediction mode information) related to prediction applied to the current block.

When performing palette mode based prediction on the current block, the encoding apparatus may apply palette mode coding disclosed in the above-described embodiments. That is, the encoding apparatus may derive palette entries, palette indexes, escape values, and the like by applying palette mode coding to the current block.

As an example, the encoding apparatus may generate palette entry information based on sample values of the current block. That is, the encoding apparatus may derive palette predictor entries and palette entry reuse information used in a block coded in the previous palette mode to configure a palette table and may derive palette entries for the current block. For example, as shown in Tables 5 and 6, the encoding apparatus may derive palette entry information such as palette_predictor_run, num_signalled_palette_entries, and new_palette_entries used to configure a palette table.

In addition, the encoding apparatus may generate palette index information for the current block based on the palette entry information. That is, the encoding apparatus may derive a palette index value of each sample while traversing the samples of the current block in a traverse scan direction (vertical direction or horizontal direction) and configure a palette index map. For example, as shown in Tables 5 and 6 above, the encoding apparatus may derive palette entry information such as palette_transpose_flag, palette_idx_idc, copy_above_indices_for_final_run_flag, num_palette_indices_minus1 used to configure a palette index map.

Here, the palette table may include representative color values (palette entries) for samples in the current block and may be composed of palette index values corresponding to respective color values. That is, the encoding apparatus may derive a palette index value corresponding to an entry (color value) in the palette table for each sample in the current block and signal the same to the decoding apparatus.

The encoding apparatus may encode image information including the palette entry information and the palette index information, and signal the same to the decoding apparatus.

In addition, in performing palette mode based prediction on the current block, the encoding apparatus may derive an escape value for the current block including at least one escape-coded sample.

As described above, since it is effective to additionally transmit a corresponding sample value for a sample having a value different from those of neighboring samples in the current block in the palette mode in terms of coding efficiency, this sample value can be signaled as an escape value. In this case, since the escape value is additional data, quantization may be performed to save it. In addition, no transform is applied to the escape value of the palette mode, and a quantized value may be directly signaled.

The encoding apparatus may derive a quantized escape value based on the escape value (S910).

As an embodiment, the encoding apparatus may derive a quantized escape value by applying a quantization parameter for the escape value to the escape value.

Here, the quantization parameter may be derived based on minimum quantization parameter information regarding the transform skip mode. For example, the quantization parameter may be derived based on the minimum quantization parameter information (e.g., min_qp_prime_ts_minus4) regarding the transform skip mode shown in Tables 7 to 9. As described above, since no transform is applied to an escape value of the palette mode, the escape value can be quantized based on the minimum quantization parameter information used in the transform skip mode.

As a specific example, as shown in Table 9, first, the encoding apparatus may derive a minimum quantization parameter value (e.g., QpPrimeTsMin) based on the minimum quantization parameter information (e.g., min_qp_prime_ts_minus4) regarding the transform skip mode. In addition, the encoding apparatus may select a larger value between the minimum quantization parameter value (e.g., QpPrimeTsMin) and the quantization parameter Qp (Qp'Y for a luma component and Qp'Cb or Qp'Cr for a chroma component) and use the same as a quantization parameter in the palette mode.

In other words, the quantization parameter in the palette mode may have a value greater than or equal to the minimum quantization parameter value (e.g., QpPrimeTsMin) derived from the minimum quantization parameter information (e.g., min_qp_prime_ts_minus4) regarding the transform skip mode.

The encoding apparatus may derive a quantized escape value using the quantization parameter in the palette mode derived as described above. The encoding apparatus may generate the quantized escape value as the palette_escape_val syntax element as shown in Tables 5 and 6 and signal the same. In addition, the encoding apparatus may generate information (e.g., palette_escape_val_present_flag) for indicating that a sample having an escape value is present in the current block and signal the same.

According to an embodiment, the encoding apparatus may limit the quantized escape value within a specific range. Since escape values have characteristics different from those of neighboring samples, they are quantized and directly signaled. However, an error due to quantization may occur. In order to reduce such an error and to code a more accurate value, the range of the quantized escape value may be limited based on the bit depth.

For example, the range of information about the quantized escape value may be determined based on the bit depth as shown in Tables 10 and 11 and may be limited such that it is not greater than (1<<BitDepth)−1, for example. In addition, the bit depth may include a bit depth BitDepthY for a luma component and a bit depth BitDepthC for a chroma component. Here, the range of quantized escape value information for the luma component may have a value between 0 and (1<<BitDepthY)−1, and the range of quantized escape value information for the chroma component may have a value between 0 and (1<<BitDepthC)−1.

Further, in one embodiment, the encoding apparatus may define the number of entries in the palette table (i.e., the number of indexes of the palette table) and signal the same to the decoding apparatus. That is, the encoding apparatus may determine palette size information regarding the maximum index of the palette table and signal the same. The palette size information may be a preset value or may be determined based on the size of a coding unit.

For example, the palette size may be represented as palette_max_size as shown in Table 12 may be the same for the entire sequence or may be determined differently according to a CU size (i.e., the number of pixels in a CU).

For example, the palette size may be represented as palette_max_size as shown in Tables 13 and 14 and may be signaled through the SPS. In this case, the palette size (e.g., palette_max_size) may indicate the maximum allowable index of the palette table and may be limited within a range from 1 to 63. In addition, the palette size (e.g., palette_max_size) may be signaled based on information (e.g., sps_palette_enabled_flag) for indicating whether the palette mode is enabled.

Further, for example, the palette size may be represented as log 2_palette_max_size as shown in Tables 15 and 16 and may be signaled through the SPS. In this case, the palette size (e.g., log 2_palette_max_size) may indicate a log 2 value of the palette size (i.e., palette_max_size+1). Accordingly, palette_max_size indicating the maximum allowable index of the palette table may be derived by calculating (1<<log 2_palette_max_size)−1 and may be limited within a range from 1 to 63. In addition, the palette size (e.g., log 2_palette_max_size) may be signaled based on information (e.g., sps_palette_enabled_flag) for indicating whether the palette mode is enabled.

Further, for example, the palette size may be derived based on log 2_palette_CU_size_TH1, log 2_palette_ max_size_TH1, and log 2_palette_max_size_default as shown in Tables 17 and 18 and may be signaled through the SPS. Since a specific embodiment of deriving and signaling the palette size has been described above in Tables 17 and 18, description thereof will be omitted herein.

The encoding apparatus may encode image information (or video information) (S920). Here, the image information may include various types of information used for the above-described palette mode coding.

As an example, the encoding apparatus may generate and encode image information including information on quantized escape values. In addition, the encoding apparatus may generate and encode image information including palette entry information and palette index information. Further, the encoding apparatus may generate and encode image information including minimum quantization parameter information regarding the transform skip mode. In this case, the image information may include an SPS, and the SPS may include the minimum quantization parameter information regarding the transform skip mode.

In addition, according to an embodiment, the encoding apparatus may determine whether to perform coding on the current block using the above-described palette mode based on information on whether the palette mode is enabled.

For example, as shown in Tables 1 to 4, the encoding apparatus may determine whether the palette mode is enabled, generate information (e.g., sps_palette_enabled_flag) on whether the palette mode is enabled according to the determination and signal the information through an SPS.

In addition, the encoding apparatus may generate information (e.g., pred_mode_plt_flag) indicating whether to code the current block by applying the palette mode thereto based on the information (e.g., sps_palette_enabled_flag) on whether the palette mode is enabled and signal the information through a coding unit syntax. For example, when the value of pred_mode_plt_flag is 1, it is possible to apply the palette mode to the current block to generate reconstructed sample by signaling palette_coding( ) syntax.

The information on whether the palette mode is enabled (e.g., sps_palette_enabled_flag) and the information indicating whether to code the current block by applying the palette mode thereto (e.g., pred_mode_plt_flag) may be encoded by being included in the image information.

The image information including various types of information as described above may be encoded and output in the form of a bitstream. The bitstream may be transmitted to a decoding apparatus via a network or a (digital) storage medium. Here, the network may include a broadcasting network and/or a communication network, and the digital storage medium may include various storage media such as USB, SD, CD, DVD, Blu-ray, HDD, and SSD.

Figure 10:
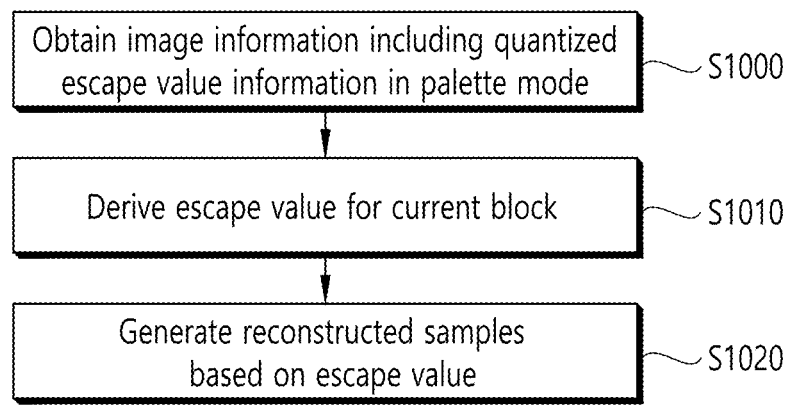
FIG. 10 schematically shows an example of a video/image decoding method according to embodiment(s) of the present disclosure.

FIG. 10 schematically shows an example of a video/image decoding method according to embodiment(s) of the present disclosure.

The method disclosed in FIG. 10 may be performed by the decoding apparatus 300 illustrated in FIG. 3. Specifically, step S1000 of FIG. 10 may be performed by the entropy decoder 310 illustrated in FIG. 3 and steps S1010 and S1020 of FIG. 10 may be performed by the predictor 330 illustrated in FIG. 3. Also, the method disclosed in FIG. 10 may include the embodiments described above in the present disclosure. Accordingly, in FIG. 10, detailed description of redundant parts in FIG. 10 and the above-described embodiments will be omitted or simplified.

Referring to FIG. 10, the decoding apparatus may receive image information (or video information) from a bitstream (S1000).

The decoding apparatus may parse the bitstream to derive information (e.g., video/image information) necessary to image reconstruction (or picture reconstruction). In this case, the image information may include information related to prediction (e.g., prediction mode information). In addition, the image information may include various types information used for the above-described palette mode coding. For example, the image information may include information on quantized escape values, palette entry information, palette index information, minimum quantization parameter information regarding a transform skip mode, and the like. That is, the image information may include various types of information required in a decoding process and may be decoded based on a coding method such as exponential Golomb coding, CAVLC, or CABAC.

As an embodiment, the decoding apparatus may obtain image information including quantized escape value information in the palette mode from the bitstream. For example, the quantized escape value information may be a palette_escape_val syntax element as shown in Tables 5 and 6. In this case, the quantized escape value information (e.g., palette_escape_val) may be obtained based on information (e.g., palette_escape_val_present_flag) indicating whether a sample having an escape value exists in the current block. For example, when a sample having an escape value exists in the current block (that is, when the value of palette_escape_val_present_flag is 1), the decoding apparatus may obtain quantized escape value information (e.g., palette_escape_val) from the bitstream.

The decoding apparatus may derive an escape value for the current block based on the quantized escape value information (S1010).

As an embodiment, the decoding apparatus may derive the escape value by performing dequantization (scaling process) on the quantized escape value based on a quantization parameter.

Here, the quantization parameter may be derived based on minimum quantization parameter information regarding the transform skip mode. For example, the quantization parameter may be derived based on the minimum quantization parameter information (e.g., min_qp_prime_ts_minus4) regarding the transform skip mode shown in Tables 7 to 9. As described above, since no transform is applied to an escape value of the palette mode, the escape value can be quantized based on the minimum quantization parameter information used in the transform skip mode. Here, the minimum quantization parameter information (e.g., min_qp_prime_ts_minus4) regarding the transform skip mode may be parsed/signaled from an SPS.

As a specific example, as shown in Table 9, first, the decoding apparatus may derive a minimum quantization parameter value (e.g., QpPrimeTsMin) based on the minimum quantization parameter information (e.g., min_qp_prime_ts_minus4) regarding the transform skip mode. In addition, the decoding apparatus may select a larger value between the minimum quantization parameter value (e.g., QpPrimeTsMin) and the quantization parameter Qp (Qp'Y for a luma component and Qp'Cb or Qp'Cr for a chroma component) and use the same as a quantization parameter in the palette mode.

In other words, the quantization parameter in the palette mode may have a value greater than or equal to the minimum quantization parameter value (e.g., QpPrimeTsMin)

derived from the minimum quantization parameter information (e.g., min_qp_prime_ts_minus4) regarding the transform skip mode.

The decoding apparatus may derive an escape value from a quantized escape value based on the quantization parameter in the palette mode derived as described above.

According to an embodiment, the decoding apparatus may limit the quantized escape value within a specific range. Since escape values have characteristics different from those of neighboring samples, they are quantized and directly signaled. However, an error due to quantization may occur. In order to reduce such an error and to code a more accurate value, the range of the quantized escape value may be limited based on the bit depth.

For example, the range of information about the quantized escape value may be determined based on the bit depth as shown in Tables 10 and 11 and may be limited such that it is not greater than (1<<BitDepth)−1, for example. In addition, the bit depth may include a bit depth BitDepthY for a luma component and a bit depth BitDepthC for a chroma component. Here, the range of quantized escape value information for the luma component may have a value between 0 and (1<<BitDepthY)−1, and the range of quantized escape value information for the chroma component may have a value between 0 and (1<<BitDepthC)−1.

Further, in one embodiment, the decoding apparatus may obtain image information including the number of entries in the palette table (i.e., the number of indexes of the palette table). That is, the decoding apparatus may obtain image information including palette size information regarding the maximum index of the palette table. Here, the palette size information may be a preset value or may be determined based on the size of a coding unit.

For example, the palette size may be represented as palette_max_size as shown in Table 12 may be the same for the entire sequence or may be determined differently according to a CU size (i.e., the number of pixels in a CU).

For example, the palette size may be represented as palette_max_size as shown in Tables 13 and 14 and may be parsed/signaled through the SPS. In this case, the palette size (e.g., palette_max_size) may indicate the maximum allowable index of the palette table and may be limited within a range from 1 to 63. In addition, the palette size (e.g., palette_max_size) may be parsed/signaled based on information (e.g., sps_palette_enabled_flag) for indicating whether the palette mode is enabled.

Further, for example, the palette size may be represented as log 2_palette_max_size as shown in Tables 15 and 16 and may be parsed/signaled through the SPS. In this case, the palette size (e.g., log 2_palette_max_size) may indicate a log 2 value of the palette size (i.e., palette_max_size+1). Accordingly, palette_max_size indicating the maximum allowable index of the palette table may be derived by calculating (1<<log 2_palette_max_size)−1 and may be limited within a range from 1 to 63. In addition, the palette size (e.g., log 2_palette_max_size) may be parsed/signaled based on information (e.g., sps_palette_enabled_flag) for indicating whether the palette mode is enabled.

Further, for example, the palette size may be derived based on log 2_palette_CU_size_TH1, log 2_palette_max_size_TH1, and log 2_palette_max_size_default as shown in Tables 17 and 18 and may be parsed/signaled through the SPS. Since a specific embodiment of deriving and parsing/signaling the palette size has been described above in Tables 17 and 18, description thereof will be omitted herein.

The decoding apparatus may generate reconstructed samples based on the escape value (S1020).

As an embodiment, the decoding apparatus may generate reconstructed samples based on the escape value with respect to a current block including at least one escape-coded sample. For example, if there is a sample having an escape value in the current block (that is, when the value of palette_escape_val_present_flag is 1), the decoding apparatus may derive the escape value as described above to generate a reconstructed sample of the escape-coded sample.

In addition, in performing palette mode based prediction on the current block (that is, when the palette mode is applied to the current block), for samples other than escape-coded samples in the current block, the decoding apparatus may obtain image information including palette entry information and palette index information and generate reconstructed samples based on the obtained image information.

As an example, the decoding apparatus may configure a palette table for the current block based on the palette entry information. For example, the palette entry information may include palette_predictor_run, num_signalled_palette_entries, new_palette_entries, and the like, as shown in Tables 5 and 6. That is, the decoding apparatus may derive palette predictor entries and palette entry reuse information used in a block coded in the previous palette mode and derive palette entries for the current block to configure the palette table. Further, the decoding apparatus may configure the palette table based on previous palette predictor entries and current palette entries.

In addition, the decoding apparatus may configure a palette index map for the current block based on the palette index information. For example, the palette index information may include palette_transpose_flag, palette_idx_idc, copy_above_indices_for_final_run_flag, num_palette_indices_minus1, and the like used to configure a palette index map as shown in Tables 5 and 6. That is, the decoding apparatus may configure a palette index map (e.g., PaletteIndexMap) based on information (e.g., palette_idx_idc) indicating a palette index value of each sample while traversing the samples of the current block based on information (e.g., palette_transpose_flag) indicating the traverse scan direction (vertical direction or horizontal direction).

In addition, the decoding apparatus may derive sample values for palette entries in the palette table based on the palette index map. The decoding apparatus may generate reconstructed samples based on the palette index map and the sample values for the palette entries.

Here, the palette table may include representative color values (palette entries) for the samples in the current block and may be composed of palette index values corresponding to respective color values. Accordingly, the decoding apparatus may derive sample values (i.e., color values) of entries in the palette table corresponding to the index values of the palette index map and generate them as reconstructed sample values of the current block.

In addition, according to an embodiment, the decoding apparatus may determine whether to perform coding on the current block using the above-described palette mode based on information on whether the palette mode is enabled.

For example, as shown in Tables 1 to 4, the decoding apparatus may obtain image information including information (e.g., s_palette_enabled_flag) on whether the palette mode is enabled, and based on this information, obtain the palette entry information, palette index information, quantized escape value information, and the like from the bitstream.

Further, for example, the decoding apparatus may obtain information (e.g., pred_mode_plt_flag) indicating whether to code the current block by applying the palette mode thereto from the bitstream based on the information (e.g., sps_palette_enabled_flag) on whether the palette mode is enabled. For example, when the value of pred_mode_plt_flag is 1, the decoding apparatus may further obtain a palette_coding( ) syntax and apply the palette mode to the current block based on information included in the palette_coding( ) syntax to obtain reconstructed samples.

In the exemplary system described above, methods are described according to a flow diagram by using a series of steps and blocks. However, this document is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of this document.

The method according to this document may be implemented in the form of software, and the encoding apparatus and/or decoding apparatus according to this document may be included in an apparatus that performs image processing, such as TV, a computer, a smartphone, a set-top box, and a display apparatus.

When the embodiments of this document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to this document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which this document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present disclosure is applied may be produced in the form of a program executed by a computer and may be stored in a computer-readable recording medium. Multimedia data having a data structure according to the embodiment(s) of the present disclosure may also be stored in a computer-readable recording medium. The computer-readable recording medium includes all types of storage devices and distributed storage devices in which computer-readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. In addition, the computer-readable recording medium includes media implemented in the form of a carrier wave (e.g., transmission through the Internet). In addition, a bitstream generated by the encoding method may be stored in a computer-readable recording medium or transmitted through a wired/wireless communication network.

Furthermore, the embodiment(s) of the present disclosure may be implemented as a computer program product by program code, and the program code may be executed in a computer according to the embodiment(s) of the present disclosure. The program code may be stored on a carrier readable by a computer.

Figure 11:
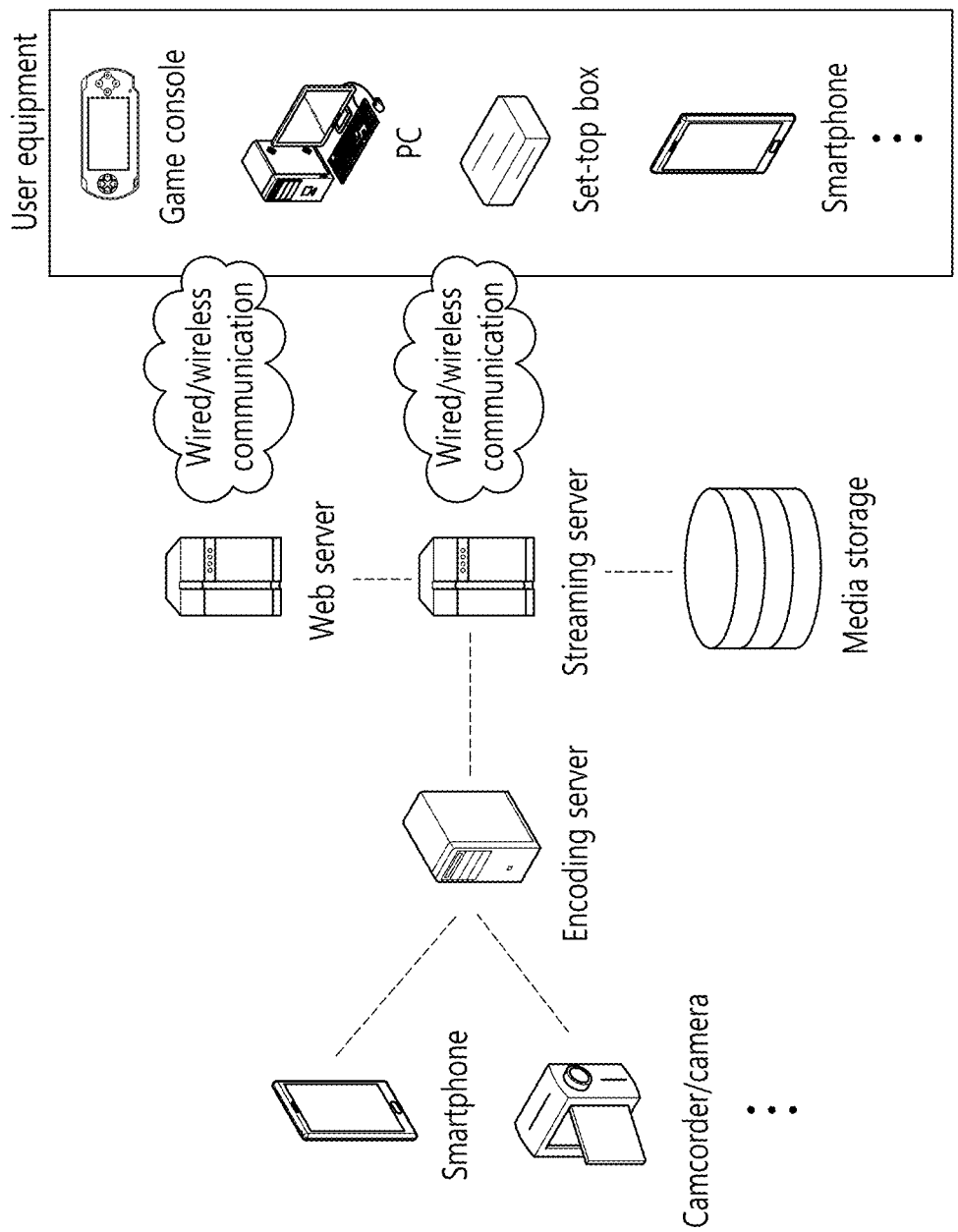
FIG. 11 shows an example of a content streaming system to which embodiments disclosed in the present disclosure are applicable.

FIG. 11 shows an example of a content streaming system to which embodiments disclosed in the present disclosure are applicable.

Referring to FIG. 11, the content streaming system applied to the embodiments of the present disclosure may include an encoding server, a streaming server, a web server, a media storage, user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document are applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in a distributed manner.

The claims described in the present disclosure may be combined in various ways. For example, the technical features of the method claim of the present disclosure may be combined and implemented as an apparatus, and the technical features of the apparatus claim of the present disclosure may be combined and implemented as a method. In addition, the technical features of the method claim and the technical features of the apparatus claim of the present disclosure may be combined and implemented as an apparatus, and the technical features of the method claim and the technical features of the apparatus claim of the present disclosure may be combined and implemented as a method.

What is claimed is:

1. A decoding apparatus for an image decoding, the decoding apparatus comprising:
   a memory; and
   at least one processor connected to the memory, the at least one processor configured to:
   obtain image information including quantized escape value information in a palette mode from a bitstream;
   derive an escape value for a current block based on the quantized escape value information; and
   generate reconstructed samples based on the escape value,
   wherein the escape value is derived based on the quantized escape value information and a quantization parameter,
   wherein the quantization parameter is derived based on information on a minimum quantization parameter for a transform skip mode, wherein the information on the minimum quantization parameter for the transform skip mode is a syntax element obtained from a sequence parameter set (SPS) included in the image information, and
   wherein the quantization parameter has a value greater than or equal to a minimum quantization parameter value derived from the information on the minimum quantization parameter for the transform skip mode.

2. An encoding apparatus for an image encoding, the encoding apparatus comprising:
   a memory; and
   at least one processor connected to the memory, the at least one processor configured to:
   derive an escape value in a palette mode for a current block;
   derive a quantized escape value based on the escape value; and
   encode image information including the quantized escape value information,
   wherein the quantized escape value is derived based on a quantization parameter for the escape value in the current block,
   wherein the quantization parameter is determined based on information on a minimum quantization parameter for a transform skip mode, wherein the information on the minimum quantization parameter for the transform skip mode is a syntax element included in a sequence parameter set (SPS), the SPS is included in the image information, and
   wherein the quantization parameter has a value greater than or equal to a minimum quantization parameter value derived from the information on the minimum quantization parameter for the transform skip mode.

3. An apparatus for transmitting data for an image, the apparatus comprising:
   at least one processor configured to obtain a bitstream, wherein the bitstream is generated based on deriving an escape value in a palette mode for a current block, deriving a quantized escape value based on the escape value, and encoding image information including the quantized escape value information to generate the bitstream; and
   a transmitter configured to transmit the data comprising the bitstream,
   wherein the quantized escape value is derived based on a quantization parameter for the escape value in the current block,
   wherein the quantization parameter is determined based on information on a minimum quantization parameter for a transform skip mode, wherein the information on the minimum quantization parameter for the transform skip mode is a syntax element included in a sequence parameter set (SPS), the SPS is included in the image information, and
   wherein the quantization parameter has a value greater than or equal to a minimum quantization parameter value derived from the information on the minimum quantization parameter for the transform skip mode.

* * * * *